(12) United States Patent
Johan et al.

(10) Patent No.: US 7,253,728 B2
(45) Date of Patent: Aug. 7, 2007

(54) TELEMETRY SYSTEM

(75) Inventors: Ron Johan, Bondi Junction (AU); James Barlow, Naremburn (AU); Joe Moldovan, Bondi (AU)

(73) Assignee: UHS Systems Pty Limited, Rosebery, New South Wales (AU)

(*) Notice: Subject to any disclaimer, the term of this patent is extended or adjusted under 35 U.S.C. 154(b) by 278 days.

(21) Appl. No.: 10/523,703

(22) PCT Filed: Jul. 21, 2003

(86) PCT No.: PCT/AU03/00921
§ 371 (c)(1),
(2), (4) Date: Feb. 7, 2005

(87) PCT Pub. No.: WO2004/012434
PCT Pub. Date: Feb. 5, 2004

(65) Prior Publication Data
US 2006/0168190 A1   Jul. 27, 2006

(30) Foreign Application Priority Data
Jul. 29, 2002   (AU) .............................. 2002950438
Aug. 26, 2002  (AU) .............................. 2002950997

(51) Int. Cl.
*G08B 23/00* (2006.01)
(52) U.S. Cl. .................. 340/531; 340/505; 340/507; 340/506
(58) Field of Classification Search ............. 340/531, 340/505, 507, 506
See application file for complete search history.

(56) References Cited

U.S. PATENT DOCUMENTS

| | | | |
|---|---|---|---|
| 4,994,908 A * | 2/1991 | Kuban et al. | 725/83 |
| 5,715,496 A * | 2/1998 | Sawada et al. | 399/8 |
| 5,939,980 A * | 8/1999 | Heitmann et al. | 340/506 |
| 5,956,343 A * | 9/1999 | Cornes et al. | 370/437 |
| 6,624,750 B1 * | 9/2003 | Marman et al. | 340/506 |

* cited by examiner

Primary Examiner—Daryl C Pope
(74) Attorney, Agent, or Firm—Whitham, Curtis, Christofferson & Cook, PC

(57) ABSTRACT

In a remote monitoring system, a supervision terminal, 37, monitors the status of the communication link, 32, 34, 36, between the supervision terminal and each of a plurality of remote terminals, 33, connected to the supervision terminal via a data network, 35. The remote terminals may be used to emulate a line interface for monitor devices such as fire alarms, 31, while providing continual assurance of the integrity of the link between the supervision terminal and the alarm.

23 Claims, 17 Drawing Sheets

Figure 1: Derived Channel Monitoring System

BAS - Burglar Alarm System
TA - ISDN Terminal Adaptor
NT1 - ISDN Network Termination Figure 2: ISDN Monitoring System Figure 7: Agency Terminal Schematic

Figure 8: Automation System Schematic

Figure 9: Registration Server Schematic

| Type 8 BITS | Length 16 BITS | ID num 32BITS | Timestamp DHMS (24BITS) | Information UP TO 100 BYTES | Crc 2BYTES |

Event/Alarm notification Message from Customer Terminal to Agency Terminal

| Type 8 BITS | Length 16 BITS | ID num 32BITS | Information UP TO 100 BYTES | Crc 2BYTES |

Acknowledge Message from Agency Terminal to Customer Terminal

Figure 15

TELEMETRY SYSTEM

TECHNICAL FIELD

This invention relates to telemetry systems and will be described in the context of security systems such as burglar alarm systems. In particular, the invention provides a system which can be interposed between existing installed telemetry equipment such as alarm panels and their associated monitoring centres.

BACKGROUND ART

The challenge for remotely monitored alarm systems has always been to ensure that the automatic alarm announcement resulting from an alarm condition is correctly received at the monitoring site, being a security company or the like, or in some instances, the alarm can be announced to local security authorities such as the police.

At their most basic form, burglar alarm systems provide an automatic telephone calling system over the normal wired telephone land line service to announce alarm conditions at a monitored site.

This system has a number of inherent disadvantages in that,
1) A burglar can cut the land line and subsequently deactivate the alarm system and thereby gain entry to premises without being detected
2) Faults in the telephone network may prevent the announcement from being received at the monitoring site
3) At the time the burglar alarm system uses the telephone land line to make an automated announcement the telephone land line is not available for others to make, say an emergency telephone call
4) As burglar alarm systems can not be uniquely identified by their own address (see U.S. Pat. No. 6,381,307 Sur-Gard Security Systems Ltd) it is a simple matter to have an unauthorised burglar system masquerading as the authorised one thereby defeating the security system In another known system (see U.S. Pat. No. 5,131,019, VerSuS Technology, Inc.), it has been proposed to additionally provide a cellular telephone or like radio communication device which can be activated to announce a burglar entry to the premises protected by the alarm if the telephone land line is cut.

This system has a number of inherent disadvantages in that,
1) Faults in the telephone network may prevent the announcement from being received at the monitoring site
2) An announcement is only sent to the monitoring site infrequently allowing the system to be disabled unbeknown to the security company, for example by a disgruntled employee
3) As burglar alarm systems can not be uniquely identified by their own address (see U.S. Pat. No. 6,381,307 Sur-Gard Security Systems Ltd) it is a simple matter to have an unauthorised burglar system masquerading as the authorised one thereby defeating the security system In another known system (derived channel monitoring system, see U.S. Pat. No. 4,442,320, Base Ten Systems, Inc.), it has been proposed to monitor the remote alarm system and the telephone land line from the telephone company's local exchange using specialised equipment installed and operated by the telephone company that directs alarm announcements to security companies or the like, or in some instances, to local security authorities such as the police. This system thus has a need for specific alarm carriage equipment in the telecommunications network which is used to collate the alarm information for retransmission to the monitoring station.

Such an Alarm Monitoring System is shown in FIG. 1 and comprises specialised alarm equipment at the remote site or customer premises, alarm scanning equipment at the local telephone exchange, central station equipment located at one of the telephone company's offices and specialised equipment at the security company. One implementation of this type of system is given below,
1) The burglar alarm system or associated equipment is connected to the telephone land line and generates a low frequency out of band signal (low tone) that is received at the telephone company's local exchange
2) The Alarm Scanning Equipment located at the telephone company's local exchange regularly polls the burglar alarm system or associated equipment with voice frequency modem signals over the telephone land line
3) The absence of low frequency signal (low tone) from the burglar alarm system or associated equipment results in the alarm scanning equipment located at the telephone company's local exchange sending a poll request to the burglar alarm system or associated equipment
4) The burglar alarm system or associated equipment responds to the poll from the alarm scanning equipment located at the telephone company's local exchange by sending as part of the poll response message the identification of the outstanding alarms. The message is forwarded to the telephone company's Central Station equipment where it is converted into an alarm announcement message which is sent to the security company over the telephone company's data network.
5) In the event that the alarm Scanning equipment located at the telephone company's local exchange does not get a response to a predetermined number of poll request messages, it informs the Central Station equipment which generates an alarm announcement message indicating that the monitored site is no longer accessible for the purposes of remote monitoring. This message is sent to the security company over the telephone company's data network.

This system has a number of inherent disadvantages in that,
1) It can only be used where the telephone company has deployed the Central Station equipment and then only from specific telephone exchanges where connection to the Alarm Scanning equipment is available
2) Redundant paths from the burglar alarm system are not supported. A failure of the Alarm Monitoring system prevents the burglar alarm system from sending any announcements to the security company.
3) The polling process uses voice frequency signalling that interferes with the use of data modems and faxes on the telephone land line
4) The low frequency out of band signal (low tone) generated by the burglar alarm system or associated equipment is incompatible with telecommunications equipment commonly used in the customer access network (last mile), further limiting the application of this technology
5) The signals transmitted on the analogue link may be encrypted, although in practice any such encryption may be detected and broken over relatively short time scales. Once the code has been broken, then an attack may be made by cutting into the line and substituting a dummy terminal which masquerades as the real terminal. This makes it possible to disable the security system at the customer premises without the monitoring service being alerted.

6) The burglar alarm system or associated equipment used for this system implement proprietary signalling and are therefore more expensive than standard burglar alarm systems that provide an automatic telephone calling system over the normal wired telephone land line service to announce alarm conditions at a monitored site 7) This system and other similar digital embodiments require the use of intermediate equipment (Central Station in FIG. 1) often controlled by a third party for example the telephone company which manipulates and relays the alarm messages to the security company 8) In this system the alarm equipment sends an announcement only when polled by the intermediate equipment (Central Station in FIG. 1)

9) The message transfer time of this system is determined by the polling rate set by Alarm Scanning equipment In another known system (ISDN monitoring system, U.S. Pat. No. 6,377,589, British Telecommunications public limited company), it has been proposed to monitor the alarm system and the telephone land line from the telephone company's local exchange by providing the telephone service over an ISDN basic rate access system over the land line.

Such a system is shown in FIG. 2 and comprises specialised alarm equipment at the remote site or customer premises, ISDN Terminal Adaptor equipment, ISDN NT1 equipment, Central Station equipment located at one of the telephone company's offices and specialised equipment at the security company. One implementation of this type of system is given below, 1) The Central Station equipment located at one of the telephone company's offices sends regular poll request messages to the burglar alarm system or associated equipment over the ISDN 'D' channel 2) The burglar alarm system or associated equipment responds to the poll request messages over the ISDN 'D' channel and in the same message sends any pending alarm announcements to the Central Station 3) The Central Station forwards the alarm announcements to the security company over the telephone company's data network 4) Redundancy is supported over the GSM network with SMS (Short Message Service) text messages This system has a number of inherent disadvantages in that, 1) It can only be used where the telephone company has deployed the Central Station equipment 2) SMS text messages do not have guaranteed delivery times and do not represent a reliable form of back-up. (Fire alarms are required to report within 15 seconds).

3) The burglar alarm system or associated equipment used for this system implement proprietary signalling and are therefore more expensive than standard burglar alarm systems that provide an automatic telephone calling system over the normal wired telephone land line service to announce alarm conditions at a monitored site 4) To use this system the users must replace their existing telephone system with an ISDN based system potentially incurring significant cost and the inconvenience of having a new telephone number assigned 5) This system and other similar digital embodiments require the use of intermediate equipment (Central Station in FIG. 2) often controlled by a third party for example the telephone company which manipulates and relays the alarm messages to the security company 6) In this system the alarm equipment sends an announcement only when polled by the intermediate equipment (Central Station in FIG. 2)

7) The message transfer time of this system is determined by the polling rate, furthermore, multiple poll periods are required to identify a break in the land line making this system unsuitable in some critical applications where the line break condition needs to be rapidly identified Another known system has set out to use the instant messaging capability of wide area networks, and in particular the Internet for the carriage of alarms. Patent application WO 01/11586 A1 describes such a system which uses a computer located in the customer premises to collect alarm indication from sensors connected to it, and uses the Internet and a central web site to report alarms and heart beat messages. The central web site reports to a response provider that either an alarm has occurred in the customer premises or that the computer in the customer premises is unreachable.

This system has a number of inherent disadvantages in that,

1) It uses the public Internet which is significantly less secure than a private data network 2) It uses a central web server which is exposed to the known denial of service attacks that can disable the entire security system leaving the customer premises unprotected 3) The computer in the customer premises which is in communication with the central web site is also used to directly acquire alarm sensor data thereby forcing the customer or user of the system to replace their existing alarm system 4) The system does not provide a fall back path to be used in the event that the connection to the Internet has been lost U.S. Pat. No. 5,943,394 (Detection Systems Inc.) describes an alarm interface system including a dialler intercept unit which connects both to the PSTN and a wide area computer network. This system connects to standard alarm systems and automatically selects, based on pretermined signals from the alarm system whether the signal is sent as is over the PSTN or is translated and sent over the wide area data network.

This system has a number of limitations, including,

1) The system connects to the wide area network through a local area network, such as Ethernet. Ethernet is a shared medium and is well known for not providing a secure link 2) The system is vulnerable to outages of the wide area network resulting from mains failures In addition, all the systems described above share the limitation that they are not directly suitable for the carriage of video.

Various telemetry and remote premises supervision systems have been proposed that use video cameras to detect motion. When motion is detected via some form of image comparison a remote alarm indication is generated and the automatic recording of video information is triggered. Some of these systems provide remote access to the video data captured to provide visual verification of alarms to eliminate false alarms. One such scheme is described by U.S. Pat. No. 6,271,752 by Lucent Technologies Inc (US).

These systems have a number of inherent disadvantages in that,

1) They operate completely independently of any alarm system currently installed in the customers premises 2) The video information is only recorded from the instant that the alarm condition has been identified, omitting events leading up to the alarm condition 3) The use of motion detection to raise alarms is susceptible to false alarms being reported The recent introduction of ADSL systems for broadband access has created a problem for burglar alarm systems that provide an automatic telephone calling system over the normal wired telephone land line service to announce alarm conditions at a monitored site. The modem used to terminate the ADSL service at the customer premises generates high frequency voltage signals that interfere with the operation of the automatic telephone calling system of the aforementioned burglar alarm systems, necessitating the installation of specialised signal filters by specialist technicians to eliminate the interference.

It is therefore an object of the present invention to mitigate one or more of the aforementioned problems.

In particular, it is advantageous to provide a system which can be interposed between existing alarm and monitor systems.

SUMMARY OF THE INVENTION

According to a first embodiment of the invention there is provided a system and method including:

one or more supervision terminals;

one or more remote terminals associated with at least one of the supervision terminals;

a data network linking the supervision terminal and the remote terminal via an "always-on" connexion through the data network providing accessibility between the or each remote terminal and the supervision terminal;

wherein;

the or each supervision terminal is in communication with each corresponding associated remote terminal across the data network using network facilities of the data network for carriage and switching or routing of messages;

wherein messages from the remote terminal to the supervision terminal are transmitted across the network, the message content being passed transparently across the network between the remote terminal to the supervision terminal;

wherein:

the supervision terminal transmits poll requests to the or each remote terminal according to a fixed or programmable routine;

the or each remote terminal, on receiving a poll request, transmits a poll response to the supervision terminal: and the supervision terminal monitors poll responses from the or each remote terminal to monitor accessibility between the remote terminal or terminals and the associated supervision terminal via the "always on" connexion.

Accordingly, this system can be interposed by the alarm system operator between existing installed alarm panels at customer premises and the system monitors at the system operators premises without the need for the installation of additional intermediate signal handling equipment in the telecommunications network.

According to a second embodiment, the or each remote terminal communicates with its associated supervision terminal or terminals using a predetermined communication protocol.

Preferably, the communication protocol used is the TCP/IP protocol suite.

In a further embodiment, the data network is a broadband network.

Preferably, the remote terminal is linked to the network via an ADSL link.

Alternatively or in addition, the remote terminal is linked to the network via a wireless link Preferably, the wireless link is a cellular network link.

In a further preferred arrangement, the wireless link is a GPRS link.

In a further embodiment, the supervision terminal is adapted to transmit poll requests to the or each remote terminal, and the or each remote terminal is adapted to transmit a poll response to the supervision terminal on reception of a poll request.

In a further refinement, the supervision terminal transmits poll requests at a poll request repetition rate, and wherein, when no poll response is received from the remote terminal within a first window period in response to a poll request, the supervision terminal transmits repeat poll requests after the first window period, the first window period being less than the poll request repetition period. Missing a predetermined number of poll responses generates alarms to the monitor system within the poll repetition period alleviating the need to wait for multiple poll periods to ascertain that the remote terminal is not responding.

Optionally, the request poll includes selectable data, and the remote terminal includes response selection means to select a releted response message from the selectable information in the poll request. To ensure security, the supervision terminal includes verification means to verify the releted response message from the remote terminal. The supervision terminal uses the poll response from the remote terminal to verify integrity of the path between the remote terminal and the supervision terminal.

Preferably, the remote terminal is adapted to transmit alarm messages independently of the reception of a polling request from a supervision terminal.

In another modification, the remote terminal is adapted to transmit heartbeats to the or each associated supervision terminal. The remote terminal may transmit heartbeats to the or each associated supervision terminal autonomously or as a response to a poll request from an associated supervision terminal.

In a further modification, the remote terminal includes a bypass switch; and remote terminal monitor means monitoring the remote terminal, the remote terminal monitor means being adapted to operate the bypass switch to disconnect the remote terminal and to connect the alarm terminal to a telephone network in the event of a failure of the remote terminal.

Preferably, the remote terminal includes a telemetry interface adapted to emulate a network interface for the corresponding telemetry equipment and to convert information received from the telemetry equipment to the network communication protocol.

In an embodiment of the system, the supervision terminal is connected to an associated monitor system, which makes information received from the supervision terminal available to an operator.

The supervision terminal preferably includes monitor interface emulation means converting information from the supervision terminal to the monitor information format.

The supervision terminal preferably includes supervision terminal self-diagnostic means and sends supervision terminal status reports to the associated monitoring system. Similarly, the remote terminal includes remote terminal self-diagnostic means and sends remote terminal status reports to the associated monitoring system.

To facilitate the process of associating remote terminals to supervision terminals, an association register recording the association between remote terminals and supervision terminals may be provided.

An additional supervision terminal may be provided for each system to provide redundancy.

The association register may be located in a registration server, and the address of the registration server installed in remote terminals to enable the remote terminals to communicate with the registration server when the remote terminal is powered up.

Preferably, the remote terminal includes a telemetry interface and the telemetry interface emulates a network interface for the corresponding telemetry equipment, converts information received from the telemetry equipment to the network communication protocol, and transmits the converted information to the supervision terminal.

The invention also encompasses a supervision terminal for use in the system, and a remote terminal for use in the system.

The present invention provides a monitoring system which offers improved security and greater flexibility in operation combined with low transmission overheads. This is achieved by utilising the broadband IP network between a plurality of Customer Terminals and a plurality of Agency Terminals, polling the Customer Terminals from the Agency Terminals on the broadband network and using the poll response messages to uniquely identify the Customer Terminals. The use of IP messaging makes possible the application unique code sequences significantly increasing security and reducing the likelihood of unauthorised Customer Terminal unit substitution.

Preferably links to the broadband network from the Customer Terminal are over cable-modem, LMDS, cellular telephone system such as GPRS, 1×RTT or third generation mobile networks (3G), DSL technology for example ADSL, Frame Relay or ATM links utilising point to point radio (such as microwave systems) or fibre-optic systems.

Preferably links to the broadband network from the Agency Terminal are over cable-modem, LMDS, cellular telephone system such as GPRS or 1×RTT, DSL technology, Frame Relay or ATM links utilising point to point radio (such as microwave systems) or fibre-optic systems.

A further advantage of the present invention is that it is suitable for implementation using standard broadband access technology such as ADSL operating on the existing telephone link. The monitoring function can then operate transparently, without interfering with the operation of the telephone line. The telephone line is therefore available for simultaneous use, for example, for voice telephony.

Preferably the Agency Terminals transmit the poll messages in one segment and the Customer Terminals return to the Agency Terminal a single poll response message also in one segment.

Preferably each polling request from the Agency Terminal includes an unencrypted random numerical value as well as information uniquely identifying the Agency Terminal and the Customer Terminal the poll is destined for. The poll response includes an unencrypted numerical value generated from a function agreed on at system initialisation used to uniquely identify the Customer Terminal.

The present invention is not limited in applicability to systems in which the remote terminal is a burglar alarm, although the high degree of security offered by the invention is particularly advantageous in this context. Other uses for the invention include remote monitoring of meters, for example electricity, gas or water meters, or remote monitoring of the status of an automatic vending machine.

In the description and claims the term 'alert condition' covers both alarm events and poll response failures.

BRIEF DESCRIPTION OF THE DRAWINGS

The invention will now be described with reference to the embodiments shown in the accompanying drawings, in which:

FIG. 15 shows the preferred format of the alarm notification messages from the Customer Terminal to the Agency Terminal and the format of the acknowledge message from the Agency Terminal to the Customer Terminal used in the preferred embodiment;

DETAILED DESCRIPTION OF EXEMPLARY EMBODIMENTS

Figure 1:
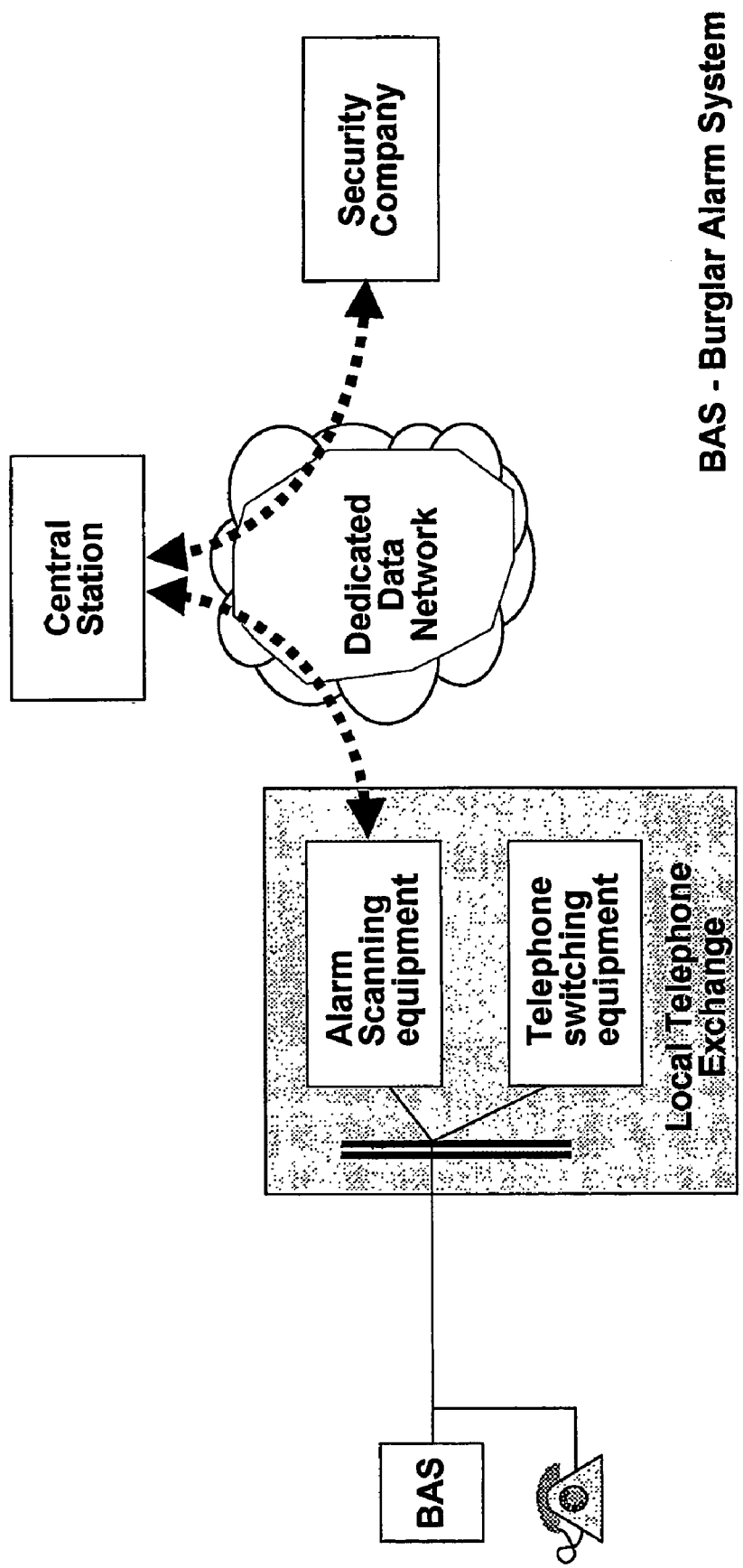
FIG. 1 shows the typical implementation of derived channel security systems that use low frequency tones generated by the customer premises equipment to provide line monitoring.
Figure 2:
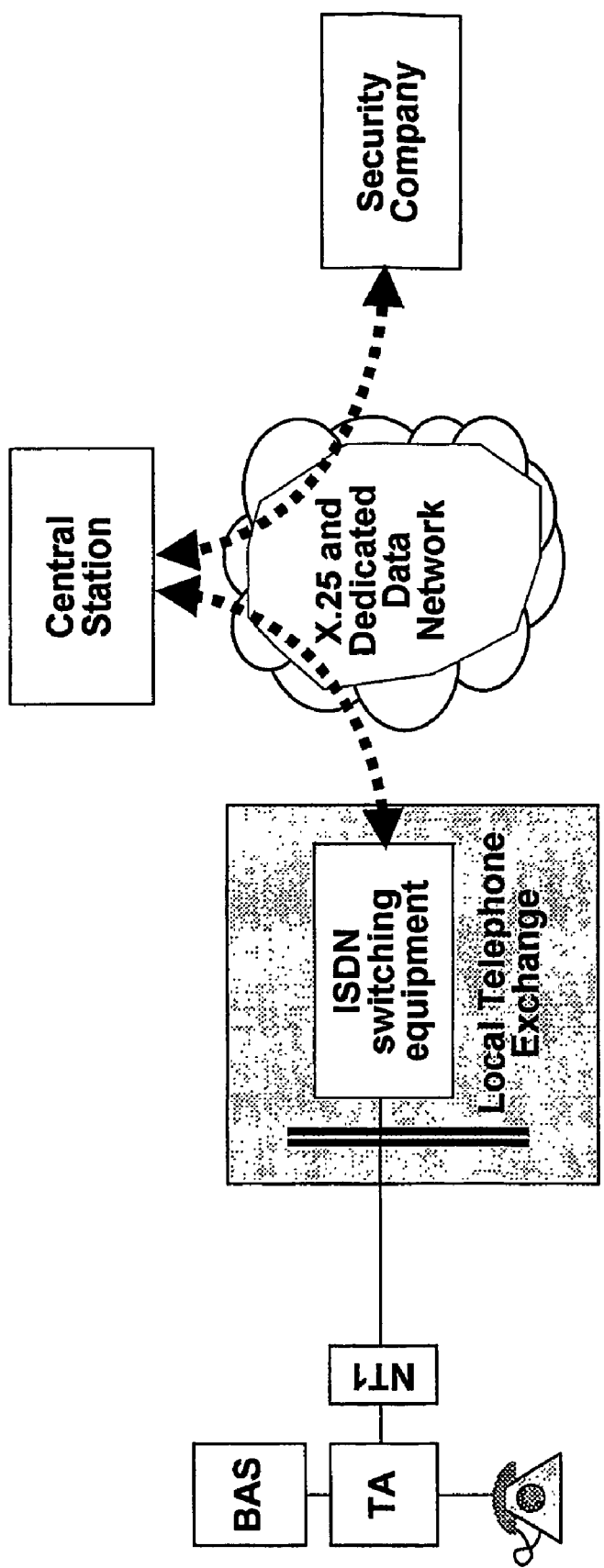
FIG. 2 shows a security network implemented over ISDN Basic rate transmission system, where the customer's burglar alarm equipment is polled over the ISDN 'D' channel.
Figure 3:
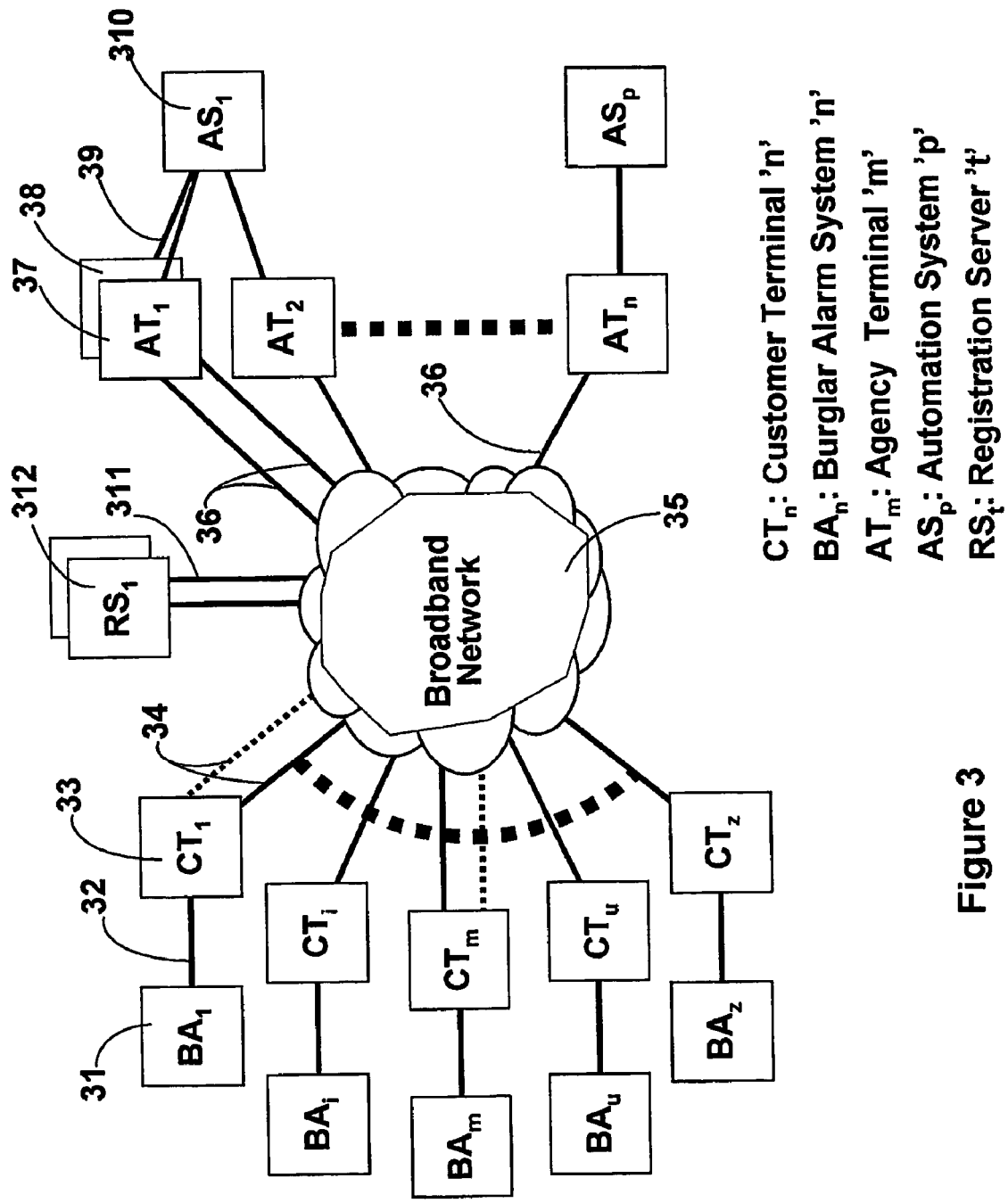
FIG. 3 is a schematic of the system embodying the present invention.

FIG. 3 shows a communications system including a broadband network (35), Customer Terminals (33), site monitoring equipment such as Burglar Alarm equipment (31), Agency Terminals (37, 38), Automation Systems (310) and Registration Servers (312).

Customer Terminals (33) are generally located at customer sites and are generally connected using the Voice Frequency (VF) interface (32) to the telephone land line connection of one or more Burglar Alarm systems (31), as for example in a residential apartment building. Other forms of connection (32) between the Customer Terminal (33) to Burglar Alarm systems (31) are possible, including Serial Interfaces, generally covered by RS.232 and RS.485, local area network, such as Ethernet and the use of individual control lines for input and output. In the prior art, Burglar Alarm systems (31) use the telephone land line connection to automatically announce to a remote monitoring centre such as a security company the triggering of one or more detectors that are used to indicate an alarm condition. The alarm condition is converted to VF using an industry standard format signal for transmission over the telephone land line.

Each Customer Terminal (33) is connected to the broadband network using one or more broadband connections (34), including but not limited to (HFC) coaxial cable, copper cable (two wire and/or four wire), optical fibre, cellular telephony or wireless. Multiple connections to the broadband network may be used to provide redundancy and path diversity. These connections provide an always-on virtual path between the Customer Terminals (33) and Agency Terminals (37). In addition, they are capable of operating in parallel with the telephone land line.

One or more Customer Terminals (33) are generally associated with one or more Agency Terminals (37) so that in the simplest configuration one Agency Terminal (37) monitors one Customer Terminal (33). For greater reliability, two or more Agency Terminals (37, 38) operating in N+1 redundancy mode may be used to monitor one Customer Terminal. Generally, two or more Agency Terminals (37) operating in N+1 redundancy mode are used to monitor one or more Customer Terminals (33). The Registration Server (312) is one of the means used by the preferred embodiment to carry out the association of Customer Terminals (33) to Agency Terminals (37). In this manner the broadband network may support one or more independent communications networks each associated with one or more security monitoring companies.

The Agency Terminals (37) are generally located on site at the security monitoring company. As this communications network can be used for purposes other than security, such as telemetry, health monitoring and so on, the Agency Terminal (37) may reside in the premises of the organisation carrying out the remote monitoring, or remotely accessed through an interface to the Agency Terminal (37).

In the preferred embodiment the alarm or event messages generated by the Burglar Alarm system (31) that are automatically announced on the Voice Frequency interface (32) using an industry standard format are intercepted by the Customer Terminal (33), which decodes the announcement, converting it into a message format suitable for transmission over the broadband network (35). In the preferred embodiment the messages are sent over the broadband network using the known Internet Protocol (IP) using the known UDP (User Datagram protocol) transport protocol, alternative embodiments using TCP as the transport protocol are also possible. The encapsulated alarm or event messages are sent by the Customer Terminal (33) to the associated Agency Terminals (37) over the one or more broadband connections (34) available to said Customer Terminal (33).

Customer Terminals (33) generally monitor the Burglar Alarm system (31) they are connected to using a range of means, including by generating and receiving test signals or by intercepting the automated alarm announcement generated by the Burglar Alarm system (31) in response to a test alarm. Customer Terminals (33) report the failure of any test sequence or any other exception to their associated Agency Terminals (37) by sending out copies of the announcement message over one or more broadband connections (34) available to said Customer Terminal (33).

Agency Terminals (37) connect into the broadband network (36) through one of a number of possible connection means, including but not limited to wireless, copper cable, optical fibre and coaxial cable. A connection over a local area network is also possible, allowing other broadband traffic to share the connection.

Agency Terminals (37) are generally, but not exclusively deployed in an N+1 redundant configuration, where $N \geq 1$. Redundant operation is achieved through the broadband network, although local interconnectivity between Agency Terminals (37) using a local area network connection between the Agency Terminals (37) is also supported (FIG. 6 reference (66)).

Figure 10:
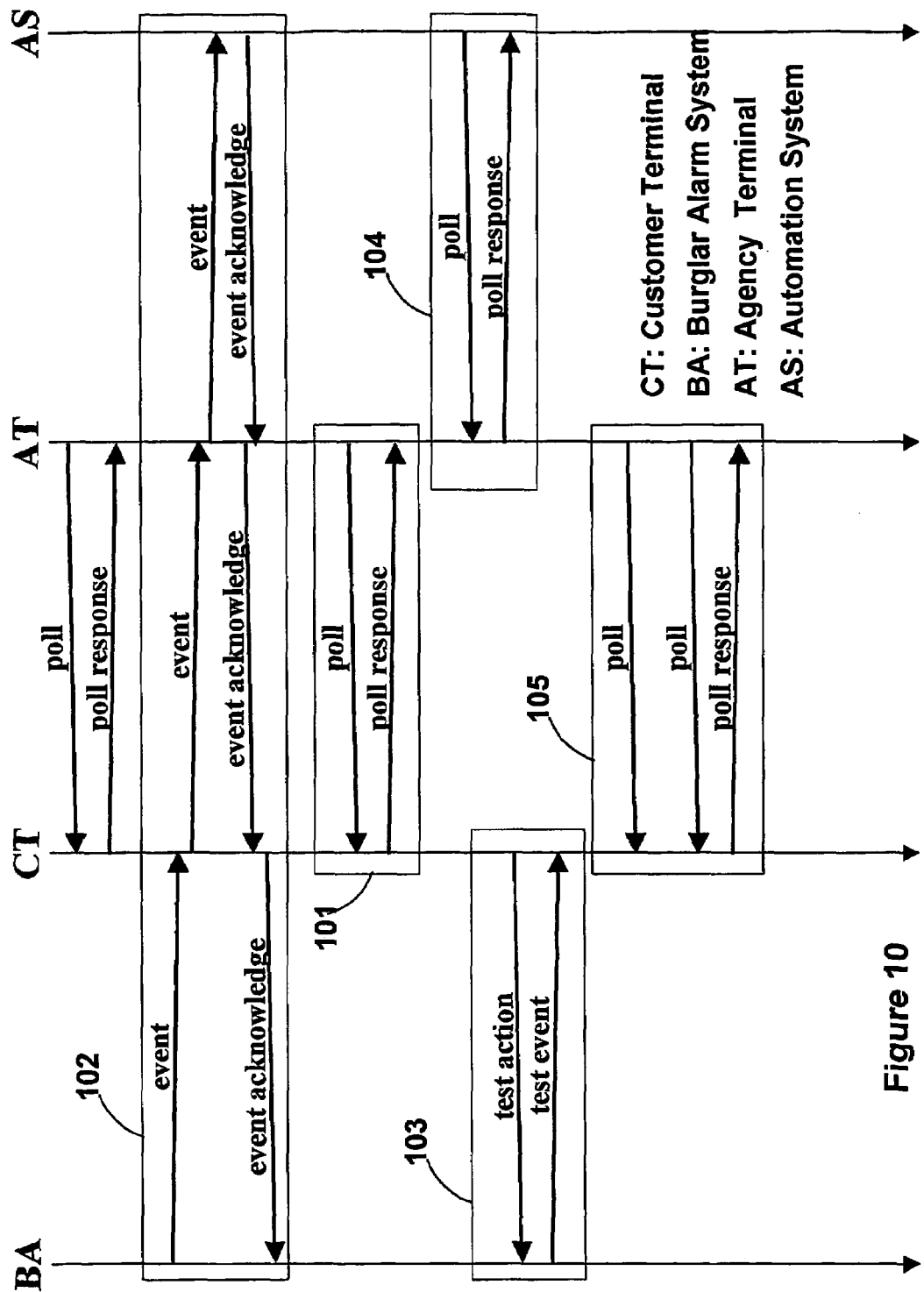
FIG. 10 is an exemplary message flow diagram illustrating the operation of the system under different operating scenarios including polling, transporting of alarms messages and the loss of poll response messages.
Figure 14:
FIG. 14 shows the preferred poll and poll response message formats used in the preferred embodiment.

The Agency Terminals (37) send poll request messages to their associated Customer Terminals (33) over the broadband network (FIG. 10 and FIG. 14). The Customer Terminals (33) send poll response messages in response to each poll request message. In the event that the Customer Terminal (33) has not responded to a predetermined number of poll requests from the Agency Terminal (37) in a specified time interval, the polling Agency Terminal (37) notifies the Automation System (310) over a data connection for example, including serial RS.232 link and a local area network connection (39).

As Customer Terminals (33) may be equipped with one or more connections into the broadband network (35) over which the polling is conducted, the severity of the loss of poll responses from a particular Customer Terminal (33) depends on the number of broadband connections (34) available to said Customer Terminal (33).

Agency Terminals (37) poll their associated Customer Terminals (33) over the broadband network (35). Each poll (FIG. 14) includes an unencrypted identifier as well as information uniquely identifying the sending Agency Terminal (37) and the destination Customer Terminal (33). The poll response from the Customer Terminal (33) includes an unencrypted identifier determined by a method programmed into the Network Processor (FIG. 4 reference (45)) of the Customer Terminal (33). The Agency Terminal (37) implements a complementary method to ensure that each poll response identifier matches the poll request identifier. The method used at the Customer Terminal (33) and the Agency Terminal (37) to generate the identifiers is agreed on as part of the Customer Terminal's (33) registration process (FIG. 11 reference (113)).

In one particular embodiment, on start up, each Agency Terminal (37) registers with the one or more Registration Servers (312) configured to provide N+1 redundancy by sending the Registration Servers (312) (FIGS. 9 and 11) its IP address and a range of customer Burglar Alarm (31) system identifiers. The Customer Terminals (33) are manufactured with the hard-coded World-Wide-Web address of the Registration Servers (312). On start up and following service restoration after equipment, network (34, 35, 36) or Agency Terminal (37) outage the Customer Terminals (33) access the Registration Servers (312) to identify their associated Agency Terminals (37).

When registering, eg, on initial installation or on reboot, Customer Terminals (33) provide the Registration Server (312) their IP address, their unique hardware identifier, and information obtained from the Burglar Alarm (31), such as security company telephone number and security account number which are obtained from the Burglar Alarm system's dial up information intercepted by the Customer Terminal (33). The Registration Server (312) uses this information to determine the destination Agency Terminals (37), and sends the IP addresses of the associated Agency Terminals (37) to the registering Customer Terminal (33) for use in sending alarm messages to the associated Agency Terminals (37).

The Registration Server (312) and Agency Terminals (37) implement methods that reduce the likelihood of unauthorised units masquerading as valid Customer Terminals (33) or Agency Terminals (37) by for example storing the range of valid unique hardware identifiers which are used to confirm the identity of the connecting unit.

Alternative embodiments that avoid the need for the Registration Server (312) through the use of for example IP VPNs are possible. In one alternative embodiment, the message route is set up as part of the customer account configuration by the Telephone Company or Internet Service Provider, so that messages from Customer Terminals (33) are routed by the network to the associated Agency Terminals (37) using a private implementation of the known Internet network and using known Domain Name Service (DNS) as the end-to-end message routing scheme avoiding the need for specialised message processing equipment in the network and eliminating the need for a Registration Server (312).

During normal operation, event and alarm messages generated by Burglar Alarm equipment (31) are sent by the Customer Terminals (33) over the broadband network (35) to their associated Agency Terminals (37). The Agency Terminals (37) implement message synchronisation schemes that ensure that only one message is sent on to the Automation System (310) (FIG. 10 reference (102)) avoiding the duplicate display of alarms which could confuse operators by generating display clutter.

The number of Agency Terminals (37) and Customer Terminals (33) shown in FIG. 3 are for the purposes of illustration only, in practice the number of terminals that may be linked to the communications network are limited only by the range of IP addresses available.

Agency Terminals (37) also send configuration and other messages to Customer Terminals (33) including software down-load (FIG. 15).

Figure 4:
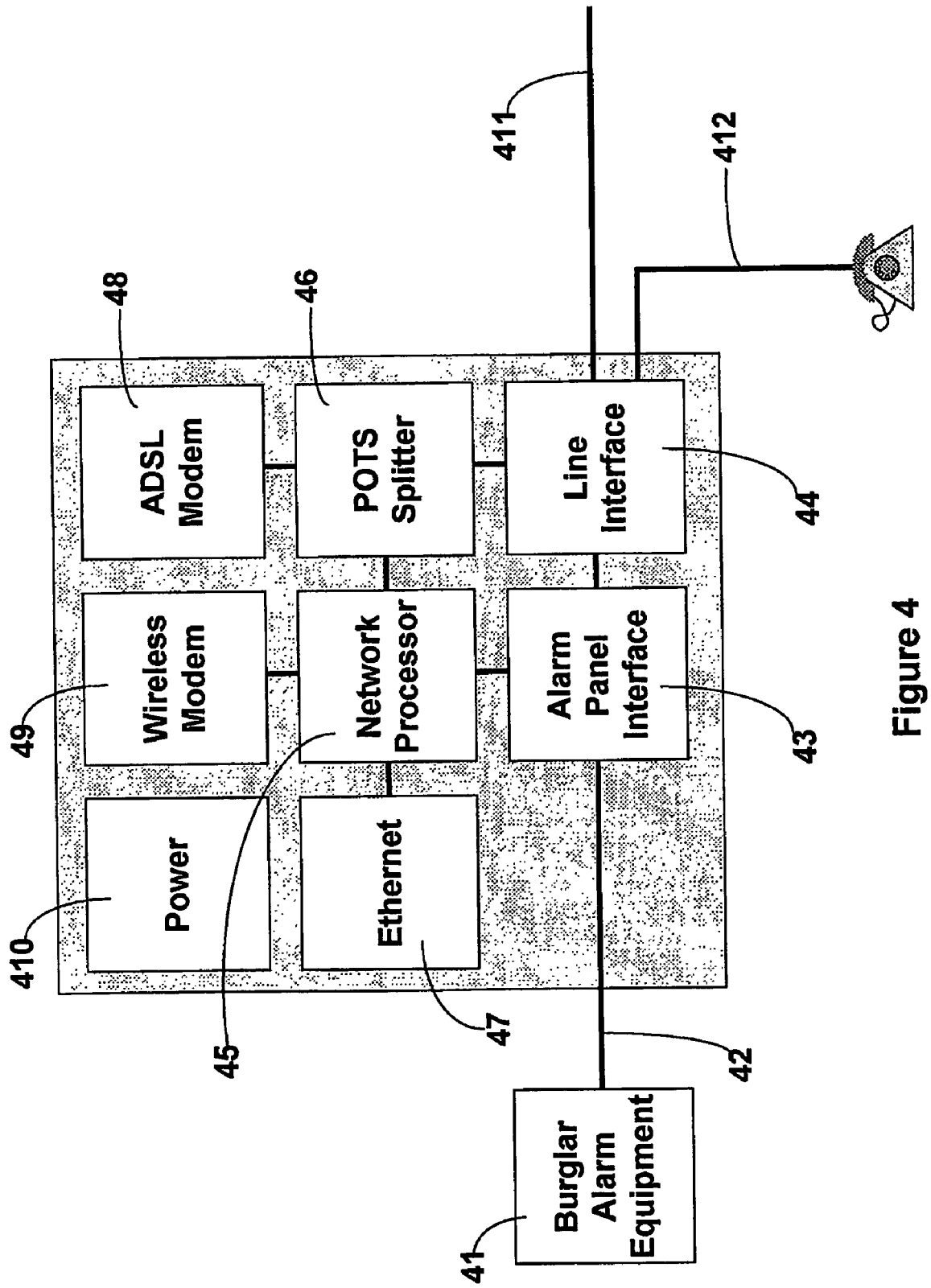
FIG. 4 is a detailed schematic of an embodiment of equipment for implementing the Customer Terminal of the system of FIG. 3.

FIG. 4 provides further detail of the components making up the preferred embodiment of the Customer Terminal supporting both ADSL (48) and wireless (49) connections into the broadband network. The Burglar Alarm Equipment (41) may be security industry standard equipment, generally available with a digital dialler and using various security industry Voice Frequency (VF) telephony formats to transmit automated announcements. The Alarm Panel Interface block (43) is programmable to receive and decode messages generated by the Burglar Alarm Equipment (41) and is capable of interpreting/decoding messages of different formats. The decoded messages from the Burglar Alarm Equipment (41) are forwarded to the Network Processor block (45) for encoding, addressing and dispatch. The Alarm Panel Interface block (43) is also used for testing the Burglar Alarm Equipment (41), and reporting any irregularities such as equipment fault, equipment missing or unauthorised reprogramming.

The Line Interface block (44) connects the Customer Terminal to the telephone land line (411) used to convey the ADSL signal and contains the switching circuitry (FIG. 5) used to bypass the Alarm Panel Interface block (43) and to provide the Burglar Alarm Equipment (41) with direct connection to the telephone land line (411) to be used to transmit automated announcements to the security company and the like in the event of a Customer Terminal failure.

In an ADSL implementation shown in FIG. 4, the POTS Splitter block (46) is used to separate out the high frequency ADSL signals from the low frequency POTS signals carried on the telephone land line (411). The low frequency POTS signal is conveyed to the in-premises telephone line (412) and the high frequency signals are conveyed to the ADSL modem block (48).

The ADSL Modem block (48) terminates the ATM cells used to carry the broadband IP data to/from the broadband network, and to forward the IP data to the Network Processor block (45). The Network Processor block (45) examines the data for messages from the associated Agency Terminals, such as poll, control, configuration and acknowledgment messages, which are terminated (see also FIG. 10). Other messages carried on the broadband connection to the Customer Terminal such as messages used when 'surfing' the Internet are passed on to the Ethernet block (47) by the Network Processor block (45). The Network Processor block (45) also ensures that messages from the Ethernet block (47) destined to the broadband network are not addressed to any of the associated Agency Terminals.

Event and alarm messages received by the Alarm Panel Interface block (43) are converted in the Network Processor block (45) into the known IP message format suitable for transmission over a broadband network. The messages are sent out simultaneously over all the equipped broadband interfaces including the ADSL (48) block and the Wireless (49) IP block, preferably implemented over a cellular network such as GSM (GPRS), CDMA (1×RTT) or 3G, to the associated Agency Terminals. The Agency Terminals send acknowledgment messages to the Customer Terminal indicating that the alarm message has been received (see also FIG. 10).

The Network Processor block (45) identifies conditions local to the Customer Terminal that need to be reported to the Agency Terminals. The Network Processor block (45) generates messages corresponding to these conditions using the known IP message format suitable for transmission over a broadband network. The messages are sent out simultaneously over all the equipped broadband interfaces including the ADSL (48) block and the Wireless (49) IP block, preferably implemented over a cellular network such as GSM (GPRS) or CDMA (1×RTT), to the associated Agency Terminals. The Agency Terminals send an acknowledgment message to the Customer Terminal indicating that the alarm message has been received (see also FIG. 10).

The Power (410) block is used to power the Customer Terminal and charge a battery for the provision of power in the event of AC mains failure.

In the preferred embodiment, the Customer Terminal may operate using an ADSL connection, using the in-built ADSL Modem (48) or using a wireless IP connection with the in-built Wireless Modem (49) which supports connection into the broadband network in places where land line connection is not supported. For improved reliability Customer Terminals may operate using both an ADSL connection, using the in-built ADSL Modem (48) and using a wireless IP connection with the in-built Wireless Modem (49).

Figure 5:
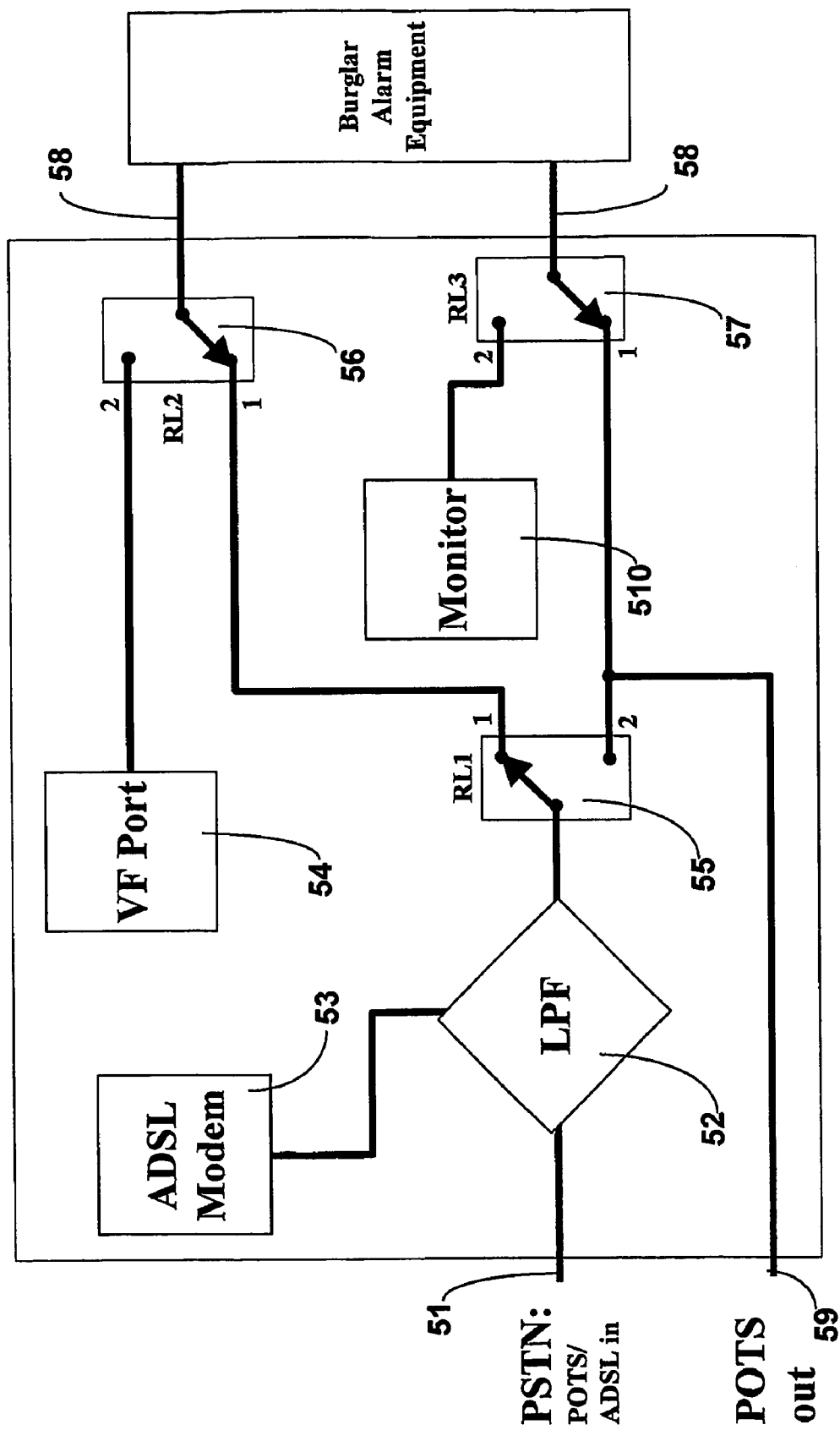
FIG. 5 is a schematic providing additional details as to the implementation of the Customer Terminal given in FIG. 4.

FIG. 5 details implementation of the voice frequency interface for the ADSL embodiment which includes the ADSL and wireless mode of operation. The telephone land (51) line used to convey the ADSL and POTS signal enters the Customer Terminal unit through an ADSL low pass filter (52). The high frequency components are directed to an ADSL modem block (53). The low frequency components pass through a normally energised relay (55), shown in the unenergised state, and exit to the in-premises telephone cabling (59). During normal operation, the telephone land line interface (58) of the Burglar Alarm Equipment is connected to the Customer Terminal's VF Port (54) through a normally energised relay (56) shown in the unenergised state. In the event of the Customer Terminal failing, or losing power, relays (55), (56) and (57) assume the states shown in FIG. 5, providing the Burglar Alarm Equipment with a direct connection to the telephone land line (58 to 51). Table 1 shows the active terminals for the relays in the powered state and in the power loss state. Terminal 2 of relay 57 may be used to monitor the line feeding signal provided to the Burglar Alarm equipment (510). More secure monitoring may be achieved by superimposing a signal, such as a tone, on the line and monitoring the signal.

TABLE 1

Relay Operation

| RELAY | Active Terminal Powered | Active Terminal Power Loss |
|---|---|---|
| 55 | 2 | 1 |
| 56 | 2 | 1 |
| 57 | 2 | 1 |

Figure 6:
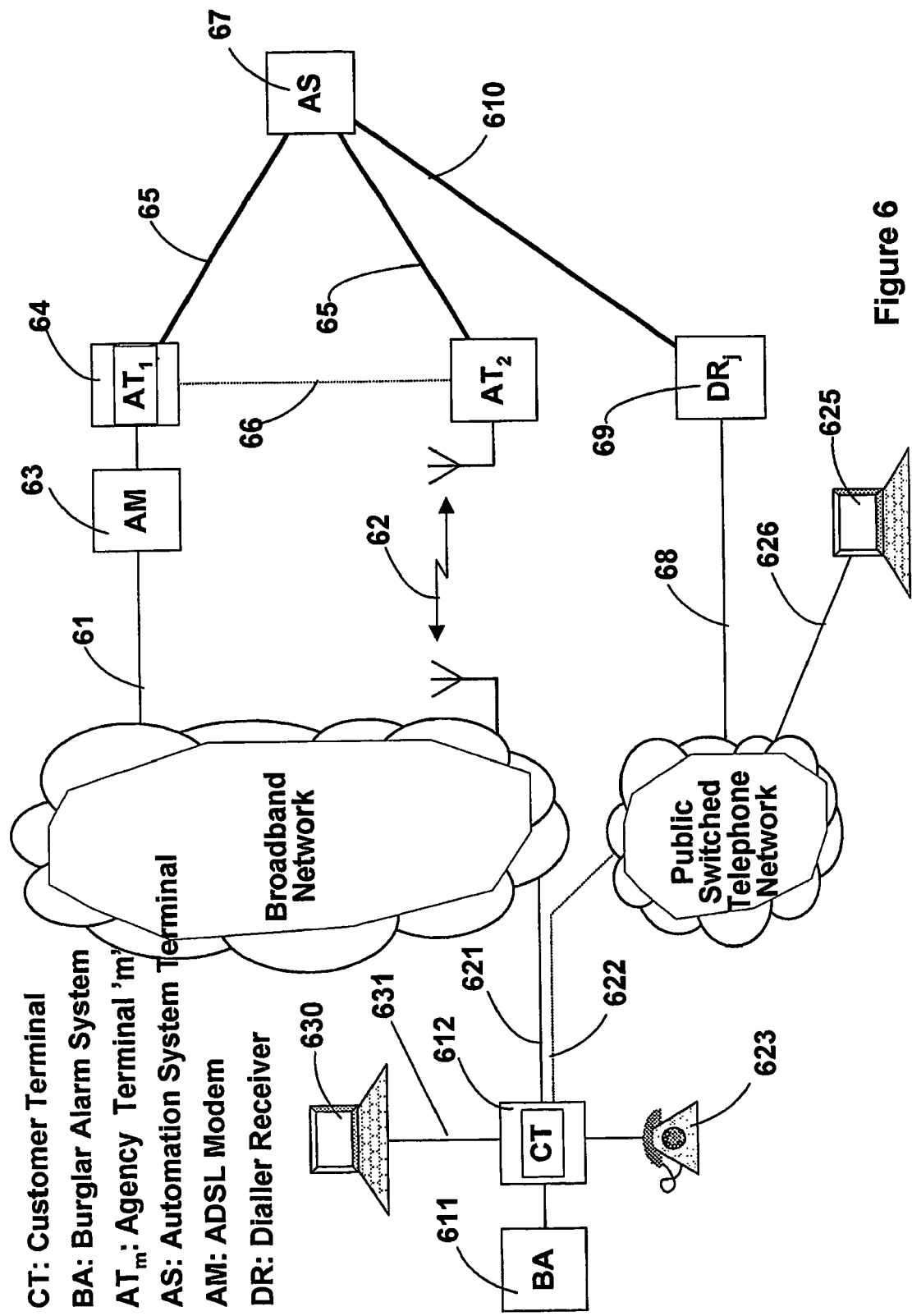
FIG. 6 is a detailed schematic of an embodiment of the network showing the Agency Terminal interconnection to the broadband network and the Automation System and the connection of the Burglar Alarm system to the Customer Terminal.

FIG. 6 details the preferred embodiment of the Agency Terminal interfaces. In the preferred embodiment, at least two collocated Agency Terminals (64) are used operating in 1+1 redundancy, each connected to the broadband network, one using an ADSL connection with a copper line (61) and an ADSL modem (63) and the other using a point to point microwave connection (62) providing both redundancy and path diversity. Optionally, the Agency Terminals (64) are connected to a local area network used for communications between Agency Terminals (64) for purposes such as process monitoring and database synchronisation. Alternative embodiments using different means of connecting to the broadband network are possible.

Agency Terminals (64) poll their associated Customer Terminals, the polling process is coordinated to ensure that only one Agency Terminal (64) polls all the Customer Terminals that are associated with the security company or the like. The non-polling Agency Terminals (64) monitor the polling Agency Terminal (64) by internal messages over their mutual local area network (66) or broadband connection. When the polling Agency Terminal (64) is found to be faulty, another associated Agency Terminal (64) takes over the polling task. Alternative embodiments are possible using dynamic load sharing between the Agency Terminals (64) in the N+1 redundancy group so that all Agency Terminals (64) in the group are involved in the polling process.

Event and alarm messages are sent by Customer Terminals to each associated Agency Terminal (64) over the broadband network connection (62, 63) for forwarding to the Automation System (67) (see also FIG. 8) for display to the security company operators. The Agency Terminals (64) maintain process synchronisation to ensure that event and alarm messages are only sent once to the Automation System (67) over the interface (65) which may include a number of options, including a serial link or a local area network. Agency Terminal (64) messages to the Automation System (67) that are not acknowledged by the Automation System (67), are re-sent by another Agency Terminal (64) after a predefined time interval has elapsed. This scheme supports equipment redundancy while eliminating unwanted message duplication.

The message formats used on the connection (65) between the Agency Terminals (64) and the Automation System (67) are similar to those used on the connection (610) between the prior art Dialler Receiver (69) and the prior art Automation System (67), which facilitates the fall-back operation mode of the system as described above whereby in the event of a malfunction of a Customer Terminal the Burglar Alarm Equipment is provided with a direct connection to the telephone land line and uses dial-up means through the public switched telephone network (68) to send alarm announcement to the Dialler Receiver (69) used to provide the back-up means and thereby to the Automation System (67).

Item (612) shows the preferred embodiment of the system when using ADSL as the broadband access. The copper line from the telecommunications network carries the signal for both the ADSL (621) and the telephony (622) services. The Customer Terminal (612) terminates the ADSL traffic. The ADSL signal is removed by filtering (46) and the reconstituted telephony signal made available to the telephone sets inside the customer's premises (623). A further advantage of this embodiment is that the installation of the central splitter is significantly simplified by having it located as part of the Customer terminal. The Burglar Alarm equipment (611) is terminated on the Alarm Panel Interface (43) of the Customer Terminal.

From time to time the customer or the monitoring company (625) may wish to access the alarm panel directly through the PSTN (626). This is achieved by implementing in the Customer Terminal Line Interface (44) a control function responsive to a bypass command. In one embodiment a Ring Detection capability is used allowing the customer to determine using software functionality the conditions under which the Customer Terminal (612) connects the Burglar Alarm equipment (611) directly to the telephone line.

The following scenarios are included
1. The customer (625) rings twice. The first ring burst is short, followed within 30 seconds by a longer ring burst which results in the Burglar Alarm equipment (611) being connected to the line by the Customer Terminal (612) to terminate the call
2. Distinctive ring, where the Customer Terminal (612) listens for a particular ring cadence. Up on detecting that cadence it connects the Burglar Alarm equipment (611) to the telephone line allowing it to terminate the call A further advantage of this arrangement is that the broadband traffic associated with the security service is terminated inside the Customer Terminal (612) and is not available on the local area network (631) eliminating the risk of unauthorised users (630) defeating the security system.

Figure 7:
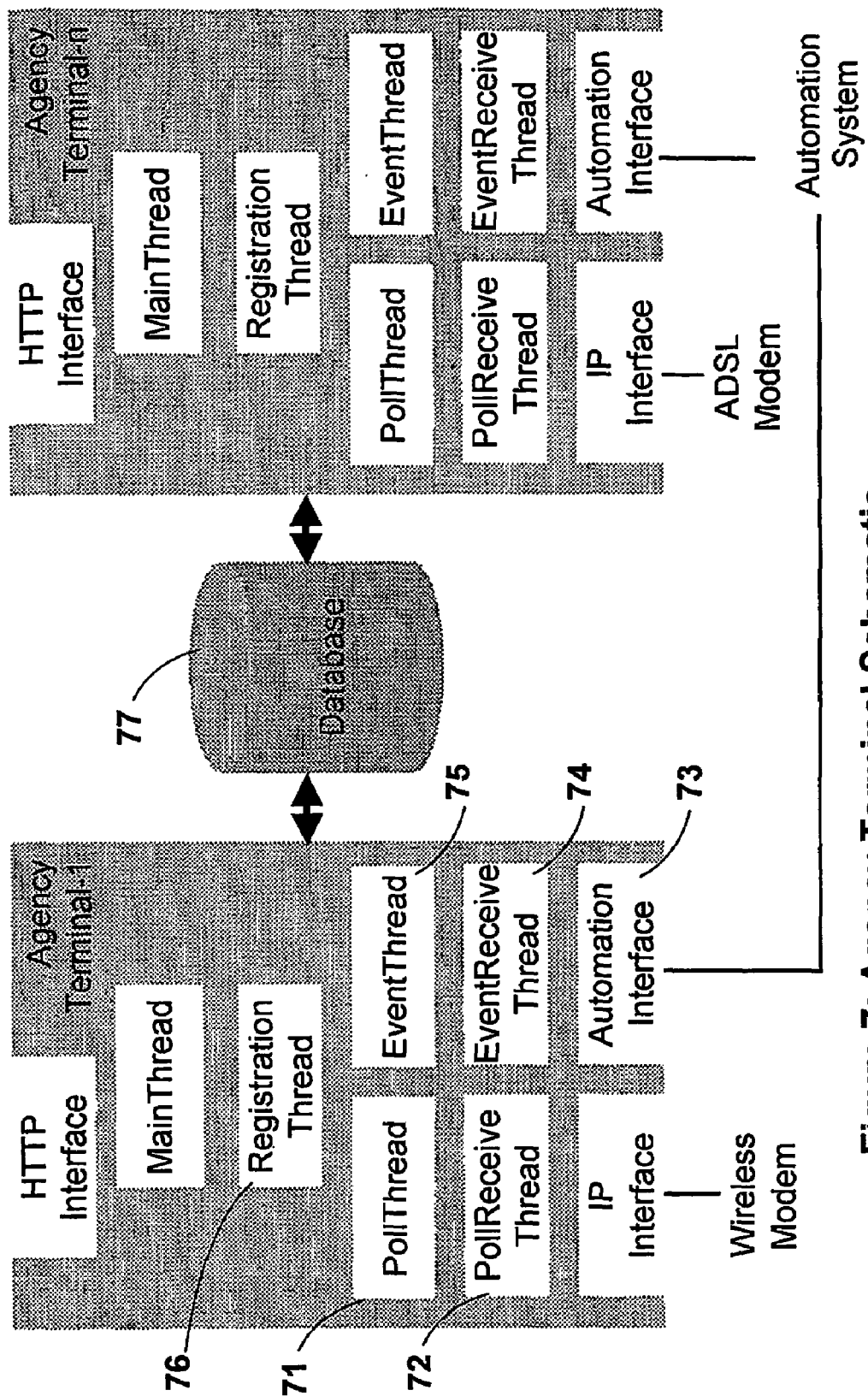
FIG. 7 is a schematic of an embodiment of the Agency Terminal.

FIG. 7 is a schematic of the preferred embodiment of the Agency Terminal implemented by means of software executing on commercially available computer equipment. In the preferred embodiment the database maintains the broadband IP addresses of all associated Customer Terminals as well as their unique hardware identifier. The PollThread (71) is used to trigger the polling of the Customer Terminals and implements the method for generating the poll request message identifier and verifying the poll response message identifier. The Agency Terminal also implements the method for decoding the alarm messages, converting the messages sent by the Customer Terminal over the broadband network into a format suitable for interfacing to the prior art Automation System. The database also provides the means for synchronisation between the two or more Agency Terminals operating in N+1 redundancy.

Figure 8:
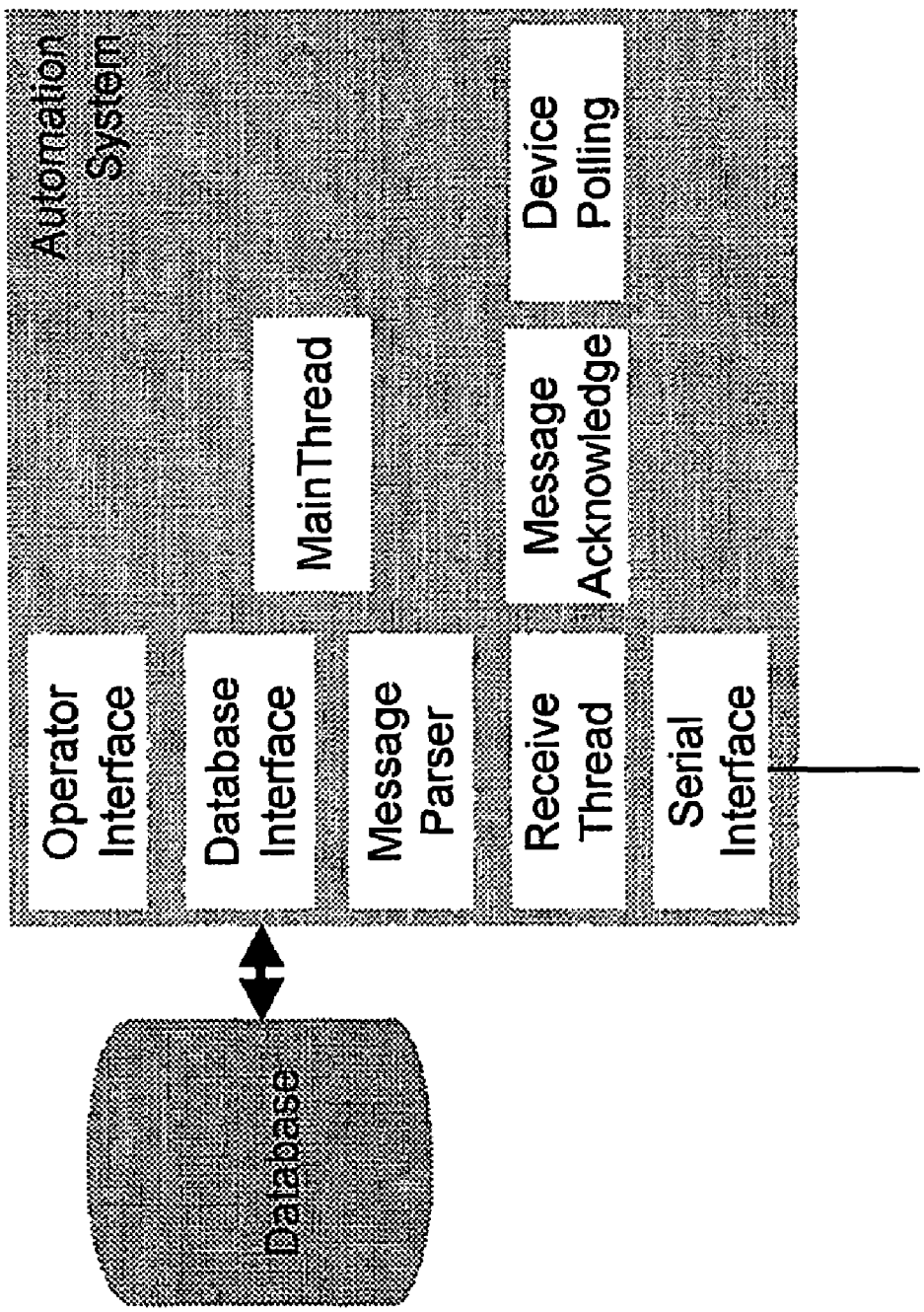
FIG. 8 is a schematic of an embodiment of the Automation System.

FIG. 8 shows a possible embodiment of a known Automation System suitable for use in a system embodying the present invention. The Automation System maintains records in its database of the active customers of the security company and the like and the alarm messages and their subsequent action for each customer. When an alarm message is received by the Automation System it displays the meaning of the message and the identity of the affected customer on a suitable display means, and provides the operator with means to determine the action to take, as agreed upon with the customer from time to time.

Figure 9:
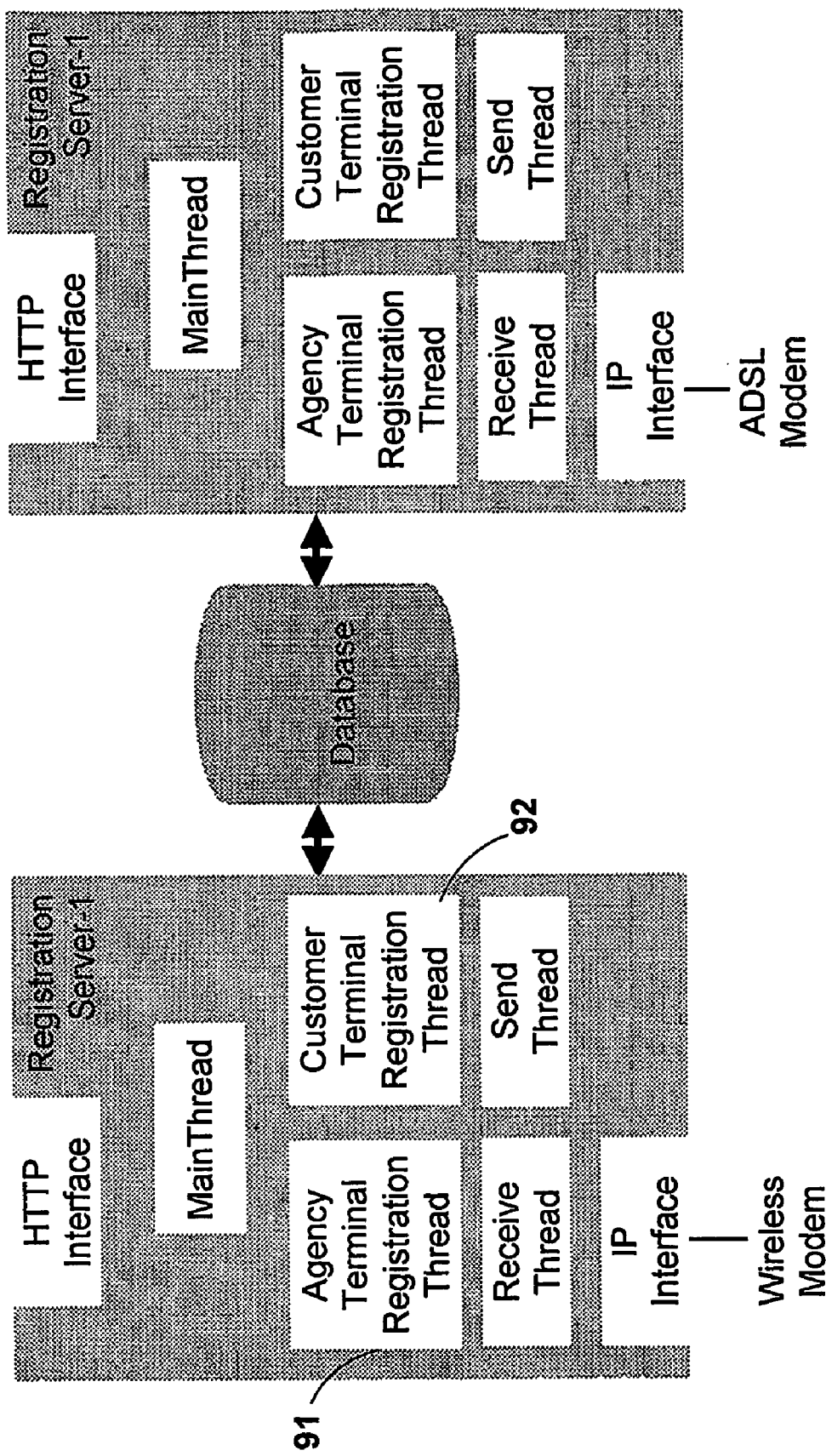
FIG. 9 is a schematic of an embodiment of the Registration Server.

FIG. 9 shows the preferred embodiment of the Registration Server, implemented as a software program executing on standard commercial computer equipment. The Registration Server may be connected to the broadband network using redundant means such as ADSL and wireless. It maintains records in its database of all active Agency Terminals and their identification codes and IP addresses. The Registration Server also maintains records in its database of all Customer Terminals and their identification codes and IP addresses. In addition, the Registration Server implements a method that allows it to identify Customer Terminals and Agency Terminals as authorised or unauthorised based on their identification codes. Authorised Agency Terminals are registered with the Registration Server, whereas unauthorised Agency Terminals are reported to the network supervision group as agreed by the relevant industry association. Authorised Customer Terminals are registered by the Registration Server and are provided with the IP addresses of their associated Agency Terminals, while unauthorised Customer Terminals are rejected and their registration attempt reported to the network supervision group.

As noted above, alternative embodiments that use IP VPNs with DNS are possible that avoid the need for the Registration Server.

FIG. 10 is a message flow diagram used in the preferred embodiment.

The process used by Agency Terminals to poll their associated Customer Terminals is illustrated by FIG. 10 (101) showing the message being sent out from the Agency Terminal (FIG. 7 functional block (71)) to the Customer Terminal (FIG. 4 functional block (45)) and the response from the Customer Terminal (FIG. 4 functional block (45)) to the Agency Terminal (FIG. 7 functional block (72)).

The messages associated with the delivery of an announcement message from the Burglar Alarm system through the communication system to the Automation System are illustrated by FIG. 10 (102). The event announcement is sent by the Burglar Alarm system to the Customer Terminal (FIG. 4 functional blocks (41) and (43)). The Customer Terminal re-formats the message for transmission over the broadband network using data packets such as UDP packets over IP (FIG. 4 functional block (45)) and forwards it to its associated Agency Terminals (74). The Agency Terminals (74) verify the source of the alarm message using the unique identifying information carried in the message and store the decoded alarm messages in their database (77), re-code the messages into the Automation System protocol and forward the messages to the Automation System (FIG. 7 functional blocks (74), (75) and (73)). Simultaneously, the Agency Terminals (74) return acknowledgment messages to the Customer Terminal (FIG. 4 functional block (45)). The Customer Terminal then acknowledges the alarm message to the Burglar Alarm system (FIG. 4 functional block (43)). The Automation System (FIG. 8) acknowledges the reception of the alarm message to the specific Agency Terminal that had sent the message to the Automation System. The Agency Terminal stores the acknowledgment message in the common database (FIG. 7 functional block (77)). The Automation System then displays the message and may trigger an audible alert to notify the system operators that a new alarm has been received.

FIG. 10 item (103) illustrates the process associated with the Customer Terminal (FIG. 4 functional block (43)) polling the Burglar Alarm system. The Customer Terminal triggers an alarm test and checks for the response. A correct response to such a test is terminated by the Customer Terminal, while a missing response (not shown) is reported to the Agency Terminal in a manner similar to the reporting of an event from the alarm system.

FIG. 10 item (104) details the polling process used by the Automation System to confirm the presence of the Agency Terminal (FIG. 7 functional block (73)).

FIG. 10 item (105) shows the messaging process involved with missed polls from the Agency Terminal to the Customer Terminal. In this process, the Agency Terminal (FIG. 7 functional block (71)) polls the Customer Terminal (FIG. 4 functional block (45)) every T-seconds. The Agency Terminal expects the Customer Terminal to response to a poll request in under t-seconds where t<T. If the response is not received in under t-seconds, the Agency Terminal (FIG. 7 functional block (72)) assumes that the response has been lost and re-polls the Customer Terminal (FIG. 4 functional block (45)) a predetermined number of times, after which if no response has been received, an alarm is sent to the Automation System. This process ensures that the loss or malfunction of any Customer Terminal is identified within the polling interval.

Figure 11:
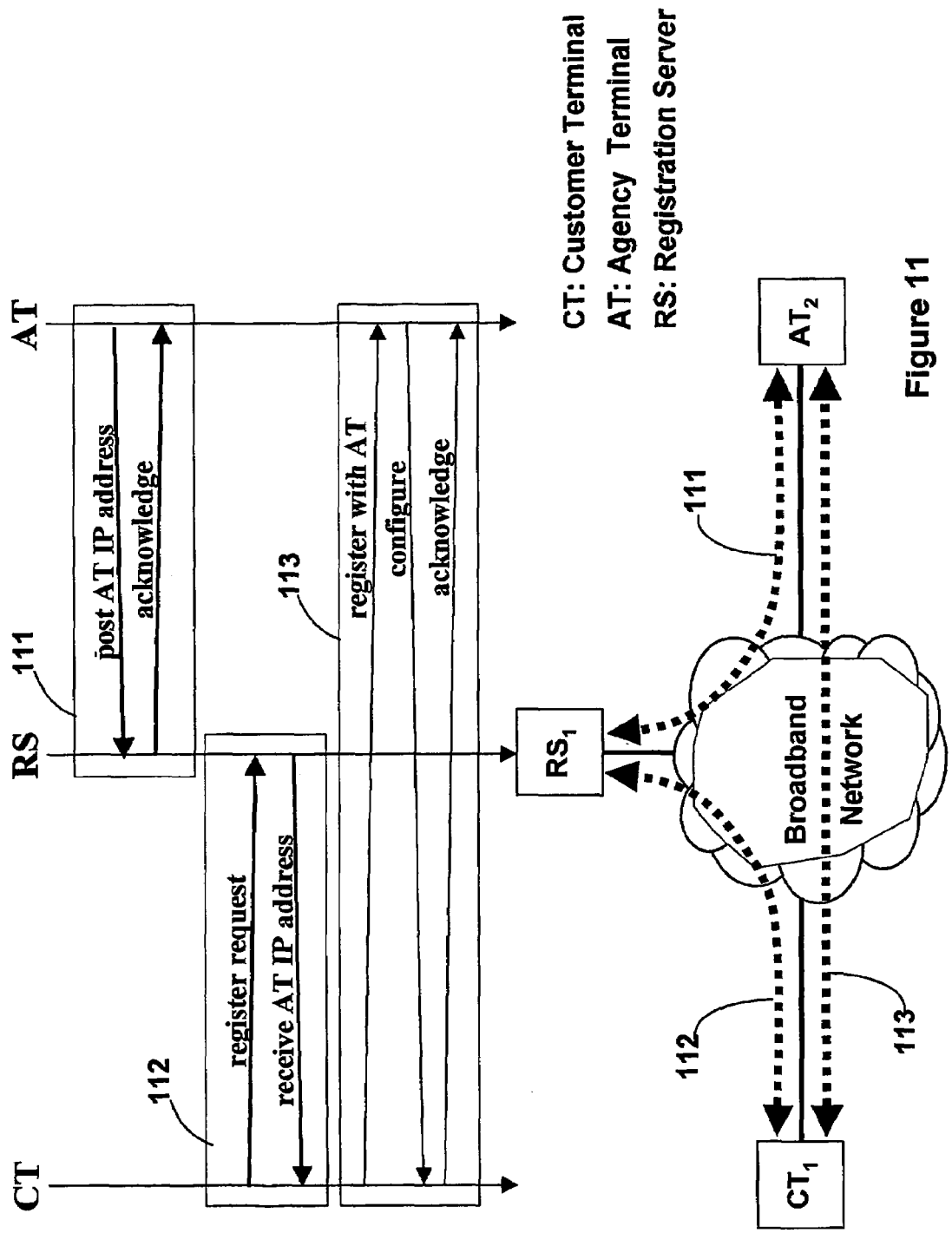
FIG. 11 is an exemplary message flow diagram illustrating the operation of the system during Customer Terminal and Agency Terminal start up scenarios.

FIG. 11 illustrates the communication system messages associated with the Registration Server.

FIG. 11 item (111) shows the messages that result when an Agency Terminal is added to the communications network. The Agency Terminal (FIG. 7 functional block (76)) registers with the Registration Server (FIG. 9 functional block (91)), in the process the Registration Server receives and stores the IP address of the registering Agency Terminal. The Registration Server returns an acknowledgment message to the Agency Terminal indicating that the registration process has been successfully completed.

FIG. 11 item (112) describes the messages that are sent to the Registration Server when a Customer Terminal is started up. The Customer Terminal (FIG. 4 functional block (45)) uses various means including for example its unique hardware identifier to identify itself to the Registration Server (FIG. 9 functional block (92)), and provides information identifying the destination security company by, for example, providing the telephone number that the Burglar Alarm system dials and the Burglar Alarm system's preprogrammed account number. The Registration Server validates the identity of the Customer Terminal and returns the IP address of each of the associated Agency Terminals. These IP addresses are used by the Customer Terminal to communicate directly with the Agency Terminals.

FIG. 11 item (113) shows the message flow following the registration process. Once registered, the Customer Terminal (FIG. 4 functional block (45)) connects to the Agency Terminal (FIG. 7 functional block (76)) using the IP address it has obtained from the Registration Server (FIG. 9 functional block (92)). The Agency Terminal then proceeds to configure (FIG. 7 functional block (76)) the Customer Terminal. Only after the Agency Terminal has completed the configuration of the Customer Terminal and has received the "acknowledge" message from the Customer Terminal does the Agency Terminal start to poll it.

Figure 12:
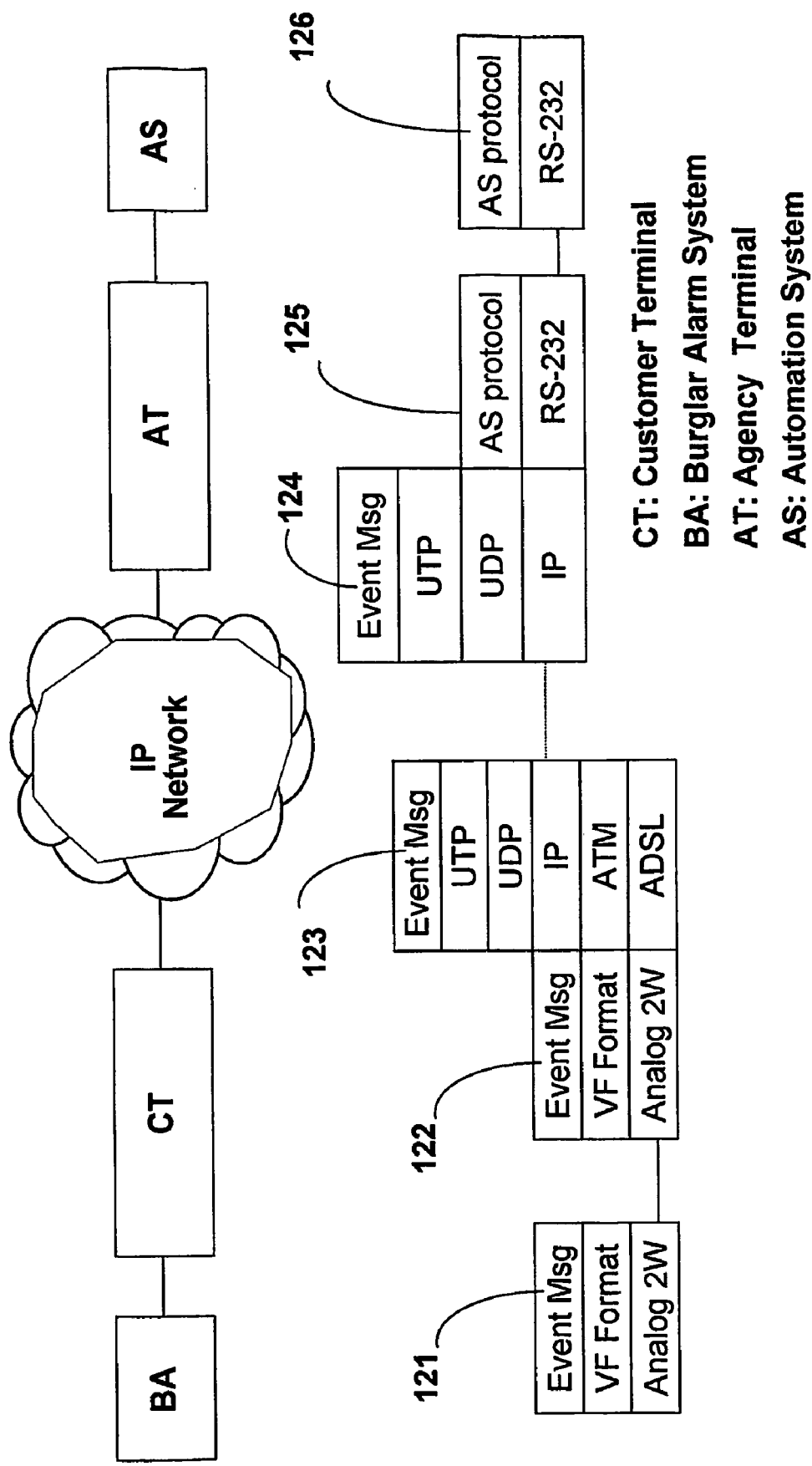
FIG. 12 shows the protocol stacks that may be used in ADSL based systems embodying the invention.

FIG. 12 details the protocol stacks used in the embodiment of the invention that uses ADSL as the connection means to the broadband network from the Customer Terminal. Item (121) shows the protocol stack implementation in the Burglar Alarm system (prior art). Automated announcements from the Burglar Alarm system are sent in known formats using voice frequency signals to be sent out over the telephone land line connection.

The Burglar Alarm communications stack (121) includes
1. Event Message generator which converts the various alarm reports to a string of digits
2. VF Format which converts the string of digits into VF tones
3. Analogue two-wire interface which applies the tone to the telephone line The Customer Terminal (FIG. 4 functional block (43)) implements a protocol stack (122) that is complementary to that in the Burglar Alarm System. This protocol stack (122) is used by the Customer Terminal to decode the messages from the Burglar Alarm System. The decoded messages are re-coded by the Customer Terminal (FIG. 4 functional block (45)) protocol stack (123) for transmission over the broadband network. The message structure used is shown in FIG. 15 and is carried as a UDP message using the existing Internet Protocol (IP) which carries the source and destination addresses for the messages.

The Customer Terminal protocol stack (122) includes
1. Analogue two-wire interface, this interface simulates the PSTN to the Burglar Alarm equipment and behaves like a dialler capture unit to receive the VF signals from the Burglar Alarm equipment
2. VF Format, this block receives and detects the VF tones used by the Burglar Alarm equipment to communicate
3. Event Message, this block reconstructs the original message sent by the Burglar Alarm equipment The Customer Terminal protocol stack (123) includes
1. Event Message block, this block assembles the event message to be transmitted to the Agency Terminal
2. UTP, this block generates the proprietary message by affixing header and trailer data to the event message
3. UDP, this block encapsulates the proprietary UTP message in the known UDP format
4. IP, this block encapsulates the UDP message in the known IP format
5. ATM, this block encapsulates the IP message in the known ATM format
6. ADSL, this block encapsulates the ATM message in the known ADSL format FIG. 12 item (124) is the protocol stack used at the Agency Terminal (FIG. 7 functional block (74)) to decode the messages from the Customer Terminal (FIG. 4 functional block (45)). The decoded messages are put through the Agency Terminal (FIG. 7 functional block (73)) protocol stack (125) for delivery to the Automation System for operator display. The reception of the event message by the Agency Terminal from the Customer Terminal is acknowledged by the Agency Terminal to the sending Customer Terminal by the Agency terminal sending the acknowledge message shown in FIG. 15.

The Agency Terminal protocol stack (124) includes
1. IP, this block un-encapsulates the UDP message
2. UDP, this block un-encapsulates the proprietary UTP message
3. UTP, this block un-encapsulates the Event Message included in the proprietary UDP message
4. Event Message, this block re-creates the original Event Message as sent by the Burglar Alarm equipment (121)

The Agency Terminal protocol stack (125) includes
1. AS Protocol, this block converts the Event Messages into a string recognisable by the known Automation System
2. RS.232, this block transfers the message string to the known Automation System using the known RS.232 serial communications format The contents of the alarm/event messages and their corresponding acknowledgment messages are encrypted for added security.

FIG. 14 shows the message format used for poll requests and poll responses. Poll requests are sent by the Agency Terminal (FIG. 7 functional block (71)) as UDP messages using the Internet Protocol, which includes the source and destination addresses of the message. The poll request is terminated on the Customer Terminal (FIG. 4 functional block (45)) which responds by sending the poll response message shown in FIG. 14, also sent as a UDP message using the Internet Protocol, which includes the source and destination addresses of the message. The poll response message is terminated by the Agency Terminal (FIG. 7 functional block (72)) that has sent the poll request.

Figure 13:
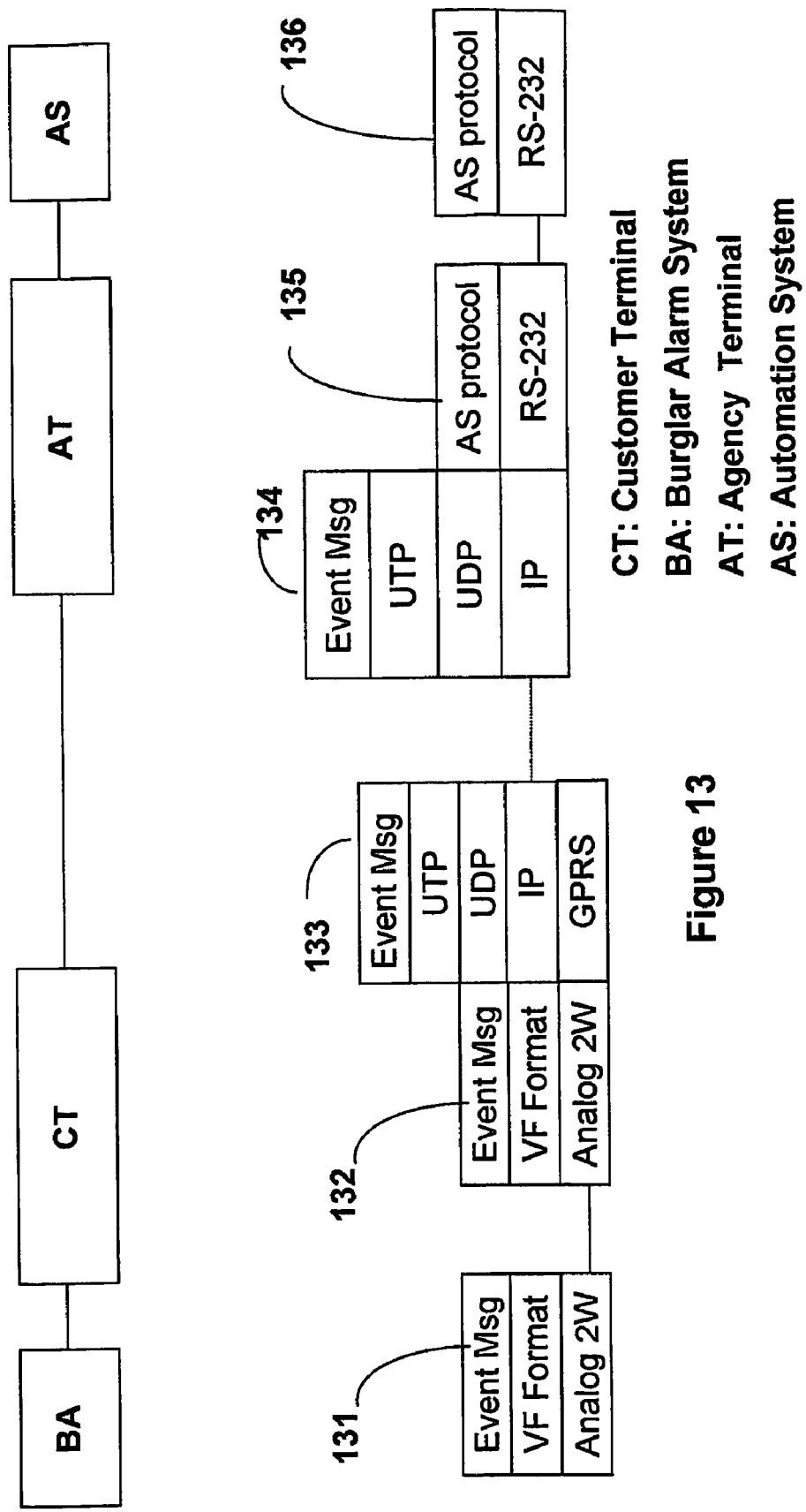
FIG. 13 show the protocol stacks used in the wireless IP based systems (for example GPRS or 1×RTT) embodying the invention.

FIG. 13 details the protocol stacks used in the embodiment of the invention that uses IP-based cellular telephony means such as GPRS or 1×RTT as the connection means to the broadband network from the Customer Terminal. The message path is similar to that outlined above for ADSL.

Figure 16:
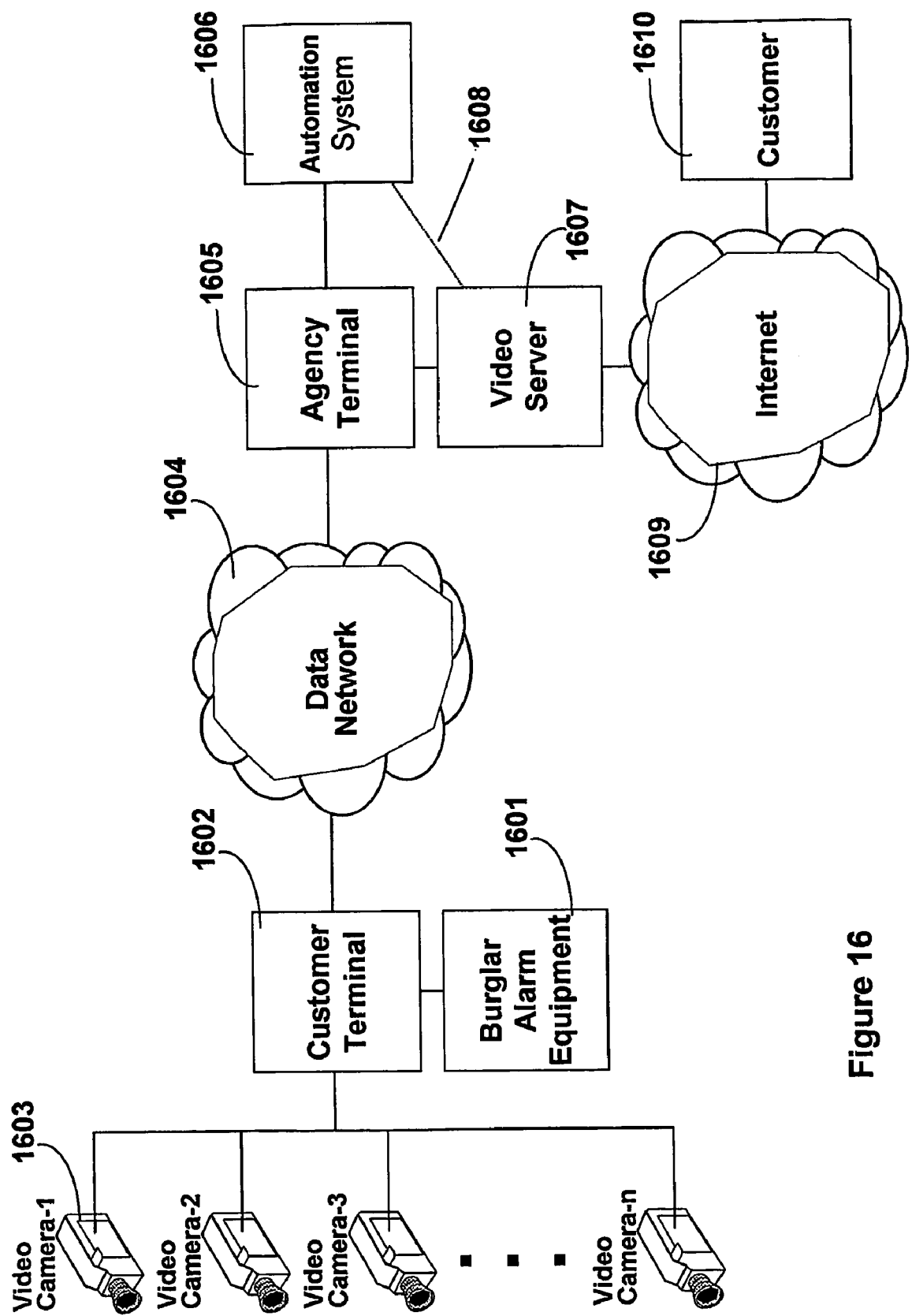
FIG. 16 shows the preferred embodiment of the invention detailing the components required to provide video functionality.

FIG. 16 details the preferred embodiment of the invention for the carriage of video signals for the use of remote alarm verification and archiving.

As shown in FIG. 16, a number of cameras (1603), are connected to the Customer Terminal (1603), to which the Alarm System (1602) is connected. The Customer Terminal (1603) connects into a data network (1604) to Agency Terminal (1605), which in turn connects to the Automation System (1606) and Video Server (1607). Automation System (1606) and Video Server (1607) may be linked by communication link (1608). Customer (1610) may be provided with secure access to the Video Server (1607) which may be provided, for example, over the Internet (1609).

The Burglar Alarm Equipment (1601) generates automatic alarm announcements that are received by the Customer Terminal (1602). The message from the Burglar Alarm Equipment (1601) identifies the type of alarm and the originating zone to the Customer Terminal (1602). The Customer Terminal (1602) is configured with a mapping between the Video Cameras (1603) and the alarm zones.

The Video Cameras (1603) are connected to the Customer Terminal using a known connection system such as USB or local area network (LAN).

Figure 17:
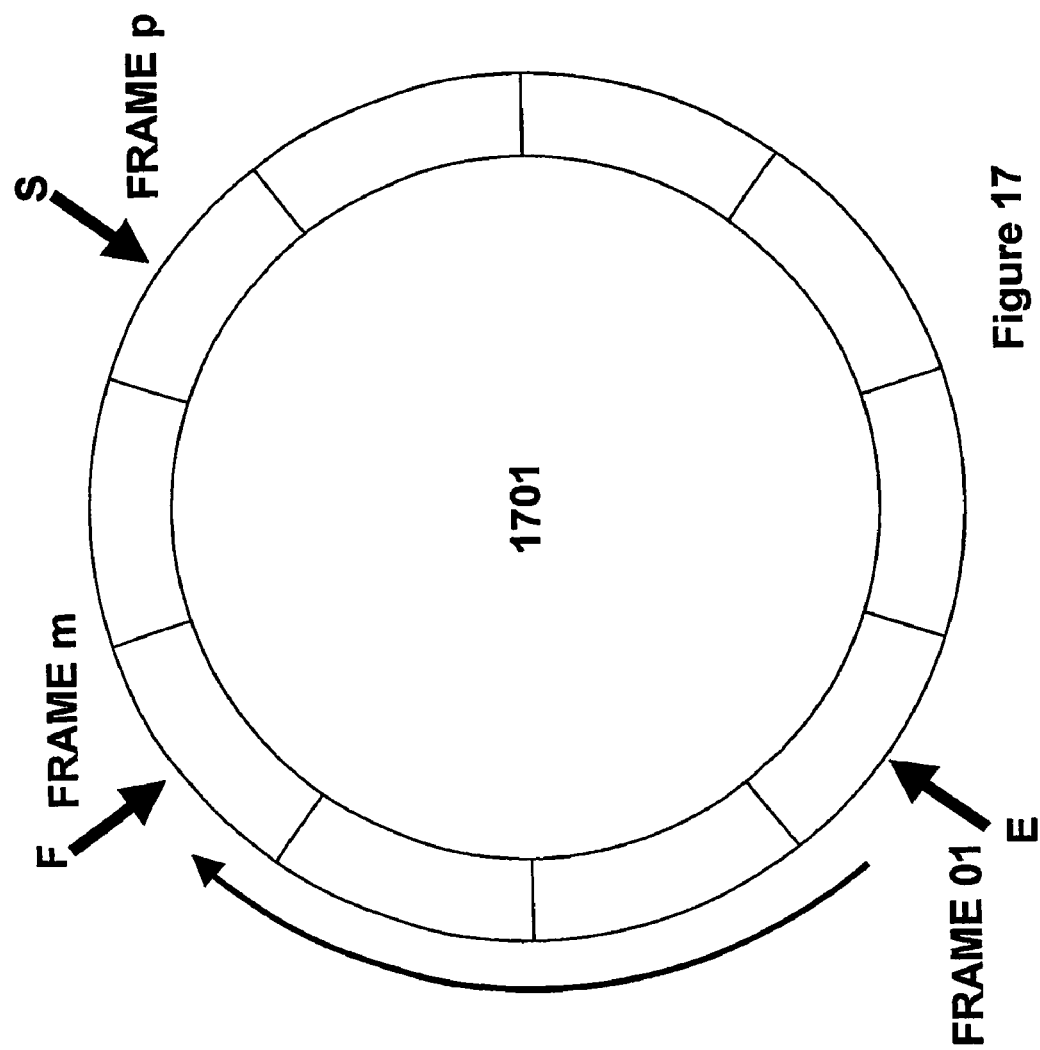
FIG. 17 shows a functional illustration of the circular buffer used at the Customer Terminal to capture video events.

The images generated by the Video Cameras (1603) are continuously captured and stored by the Customer Terminal Network Processor (FIG. 4 Item (45)) in individual circular buffers 1701 (FIG. 17) of pre-determined length. Each Video Camera (1603) is allocated a unique circular buffer 1701. When an event occurs in a zone that corresponds to a particular Video Camera (1603) (or any zone), a pointer is used to identify the corresponding video frame in the circular buffer designating Frame 01 (FIG. 17 Item 'E'). Another pointer designating Frame p (FIG. 17 Item 'S') is used to identify the last position in the circular buffer which is not to be over-written. The third pointer designating Frame m (FIG. 17 Item 'F') is the next position in the circular buffer to which a video frame is to be written. Pointer 'F' may be thought of as moving clock-wise as it fills the buffer, that is it indexes from Frame 01 to Frame p. Once pointer 'F' reaches pointer 'S', that is, the next frame to be written is Frame p, the recording stops. This method allows for images of activities leading up to the alarm to be stored as well as images of events following the alarm.

In a preferred embodiment, when the camera receives an event signal from its associated detector, the camera records one or more frames at a higher resolution and possibly switching from black and white to colour to improve the clarity of the corresponding images.

The Customer Terminal (1602) forwards the message from the Burglar Alarm Equipment (1601) to the Agency Terminal (1605) via the Data Network (1604) as described above.

The Agency Terminal (1605) forwards the message to the Automation System (1606). Concurrently the Agency Terminal (1605) uses the message type and the originator to identify the alarm as having associated video information (FIG. 7 Item (77)). The Agency Terminal (1605) commands the Customer Terminal (1602) to send the video information stored in the circular buffer 1701 (FIG. 17). The received video data is time-stamped and stored on the Video Server (1607) its location noted in the Agency Terminal (1605) database (FIG. 7 Item (77)).

The video information on the Video Server (1607) can be accessed by the Security Company operator using a specialised application executing on the Automation System (1606) over link 1608. In addition, at the Security Companies discretion, the customer (1610) may access the Video Server (1607) directly through the Internet (1609) via a secure web site and view the stored images on a known web browser using known plug-ins.

Following the up-loading of the data from the circular buffer (FIG. 17), the Video Camera (1603) continues recording images in the circular buffer. These can be up-loaded to the Video Server (1607) on command from the Agency Terminal (1605).

Video recording may be locally disabled by the customer when disarming the Burglar Alarm Equipment (1601), which results in an 'opening' message being sent when the customer is present on the premises, and automatically enabled when the Burglar Alarm Equipment (1601) is armed sending a 'closing' message to the Automation System (1660).

The invention claimed is:

1. A telemetry system including:
   one or more supervision terminals;
   one or more remote terminals associated with at least one of the one or more supervision terminals;
   a data network linking the one or more supervision terminals and the one or more remote terminals via an always-on connection through the data network via a path between the one or more supervision terminals and the one or more remote terminals;
   wherein;
   the one or more supervision terminals is in communication with one or more corresponding associated remote terminals across the data network using network facilities of the data network for carriage and switching or routing of messages;
   wherein messages from the one or more remote terminals to the one or more supervision terminals are transmitted across the network, the message content being passed transparently across the network between the one or more remote terminals to the one or more supervision terminals;
   wherein the one or more supervision terminals monitor the integrity of the path between the one or more remote terminals according to a fixed or programmable routine; and
   wherein the one or more supervision terminals monitor poll responses from the one or more remote terminals to determine path integrity.

2. A telemetry system as claimed in claim 1, including one or more monitoring devices connected to one or more remote terminals, wherein the one or more remote terminals monitor the one or more monitoring devices and report the condition and/or status of the one or more monitoring devices to the one or more supervision terminals.

3. A system as claimed in claim 1, wherein the one or more remote terminals are linked to the network via an ADSL link and/or a wireless link.

4. A system as claimed in claim 1, wherein the one or more supervision terminals incorporate, or are connected to an associated monitor system, the monitor system being adapted to make information received from the one or more supervision terminals available to an operator, wherein the one or more supervision terminals include monitor interface emulation means converting information from the one or more supervision terminals to the monitor information format.

5. A system as claimed in claim 1, wherein the one or more supervision terminals and/or the one or more remote terminals include supervision terminal self-diagnostic means and/or remote terminal self-diagnostic means respectively, and send supervision terminal status reports or remote terminal status reports respectively to the associated monitoring system.

6. A system as claimed in claim 1, including an association register recording the association between one or more remote terminals and one or more supervision terminals, the association register being accessible to the one or more supervision terminals, wherein the one or more supervision terminals and the one or more remote terminals have access to the association register via the data network.

7. A system as claimed in claim 1, including one or more image capture devices linked to the one or more remote terminals, and a memory associated with the one or more image capture devices, the memory recording a moving time window of images from the image capture device.

8. A system as claimed in claim 7, including one or more associated detectors, wherein an image capture command from any of said detectors freezes the moving time window in the memory to capture a series of images in a specific time interval.

9. A system as claimed in claim 8, wherein at least some post-image capture command images are stored in a further buffer.

10. One or more supervision terminals for use in a system as claimed in claim 1, including:
    a supervision terminal network interface means adapted to respond to an alert condition originating from one or more remote terminals, monitor system interface adapted to transmit an alert message to an associated monitor system and to receive a first acknowledgment message therefrom, the supervision terminal network interface being adapted to transmit a second acknowledgment signal to the one or more remote terminals from which the alert condition originated, the one or more supervision terminals including a poll request generator to transmit poll requests to the one or more remote terminals, the one or more supervision terminals including a poll response processor to monitor the poll responses received from the one or more remote terminals to monitor the integrity of the path between the one or more supervision terminals and the one or more remote terminals, the one or more supervision terminals including a message receiver to receive messages from the one or more remote terminals which have been transmitted across the network without processing of the message content at an intermediate point in the network.

11. One or more supervision terminals for use in a system as claimed in claim 1, the one or more supervision terminals including:

path integrity monitoring means adapted to monitor the integrity of the path between the one or more supervision terminals and one or more remote terminals by transmitting poll requests to the one or more remote terminals and monitoring the poll response from the one or more remote terminals to verify the integrity of the path between the one or more supervision terminals and the one or more remote terminals, wherein the one or more supervision terminals are adapted to receive messages from the one or more remote terminals the message content of which has been transmitted transparently across the network through the intermediate nodes in the network.

12. One or more supervision terminals as claimed in claim 11, including:

a supervision terminal network interface;
alert condition storage means;
alert condition processing means;
a monitor system interface including:
message means transmitting an alert condition originating from the one or more remote terminals to the monitor system;
means for receiving and storing of a first acknowledgment message sent by the monitoring system.

13. One or more remote terminals for use in a system as claimed in claim 1, including a remote terminal network interface means adapted to:

receive and respond to poll requests from one or more associated supervision terminals;
transmit alert condition to one or more associated supervision terminals;
monitoring device interface adapted to receive monitoring messages originating from the associated monitoring device and to transmit third acknowledgement messages to the monitoring device;
wherein the one or more remote terminals are adapted to receive messages from the one or more supervision terminals the message content of the messages being transmitted transparently across the network through the intermediate nodes in the network.

14. One or more remote terminals as claimed in claim 13, including:

a bypass switch; and
remote terminal monitor means monitoring the one or more remote terminals, the remote terminal monitor means being adapted to operate the bypass switch to disconnect the one or more remote terminals and to connect an associated monitoring device to a telephone network in the event of a failure of the one or more remote terminals.

15. One or more remote terminals as claimed in claim 13, wherein the address of one or more association registers is recorded in the one or more terminals to enable the one or more terminals to communicate with the registration server.

16. One or more remote terminals as claimed in claim 13, including one or more image capture devices linked to the one or more remote terminals, the one or more image capture devices being associated with one or more associated detectors to capture images of a designated area on receipt of an image capture command from an associate detector.

17. One or more remote terminals as claimed in claim 16, wherein the one or more image capture devices is associated with a first corresponding associated circular buffer capable of recording a predetermined amount of image information into which the one or more image capture devices continually store image information, and wherein, on receipt of an image capture command, the one or more remote terminals cause the storing of image information into the first circular buffer to cease after a predetermined amount of image information is stored in the first circular buffer, leaving a predetermined amount of pre-image capture command information remaining in the buffer.

18. A system as claimed in claim 16, wherein at least some post-image capture command images are stored in a further buffer.

19. A method of transmitting information in a telemetry system including:

one or more supervision terminals;
one or more remote terminals associated with the at least one or more supervision terminals;
a data network linking the one or more supervision terminals and the one or more remote terminals via an always-on connection through the data network;
the method including the steps of:
monitoring the one or more remote terminals from at least one of the one or more associated supervisions terminals via the data network using the network facilities for carriage and switching or routing of messages;
transmitting messages from the one or more remote terminals to the one or more supervision terminals across the network, the message content being passed transparently across the network between the one or more remote terminals to the one or more supervision terminals; and
monitoring the path integrity between the one or more supervision terminals to the one or more remote terminals by transmitting poll requests from the one or more supervision terminals to the one or more remote terminals and monitoring poll responses from the one or more remote terminals according to a fixed or programmable routine; and
wherein the one or more supervision terminals monitors poll responses from the one or more remote terminals.

20. A method as claimed in claim 19, wherein the one or more remote terminals transmit association information to an association register.

21. A method as claimed in claim 19, wherein the one or more remote terminals retrieve information from the associated monitoring device for transmission to the association register.

22. A method as claimed in claim 19, including compiling a registration table associating the one or more remote terminals with the one or more associated supervision terminals.

23. A method as claimed in claim 22, including installing the address of the registration table in the one or more remote terminals, the one or more remote terminals being programmed to communicate with the registration table on start up of the one or more remote terminals.

* * * * *